United States Patent
Strubbe et al.

(10) Patent No.: US 6,721,706 B1
(45) Date of Patent: Apr. 13, 2004

(54) ENVIRONMENT-RESPONSIVE USER INTERFACE/ENTERTAINMENT DEVICE THAT SIMULATES PERSONAL INTERACTION

(75) Inventors: Hugo J. Strubbe, Yorktown Heights, NY (US); Larry J. Eshelman, Ossining, NY (US); Srinivas Gutta, Buchanan, NY (US); John Milanski, Tarrytown, NY (US); Daniel Pelletier, Cortlandt Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 415 days.

(21) Appl. No.: 09/699,606

(22) Filed: Oct. 30, 2000

(51) Int. Cl.[7] .............................................. G10L 15/00
(52) U.S. Cl. ...................... 704/275; 704/270; 704/257
(58) Field of Search ................................ 704/200, 246, 704/251, 270, 271, 257; 128/904

(56) References Cited

U.S. PATENT DOCUMENTS

| | | | |
|---|---|---|---|
| 5,223,924 A | 6/1993 | Strubbe ........................ 358/86 |
| 5,515,173 A | 5/1996 | Mankovitz et al. .......... 358/335 |
| 5,596,994 A | * 1/1997 | Bro ............................. 128/732 |
| 5,617,855 A | 4/1997 | Waletzky .................. 128/653.1 |
| 5,673,089 A | 9/1997 | Yuen et al. .................. 348/734 |
| 5,676,551 A | * 10/1997 | Knight et al. ............... 434/236 |
| 5,892,901 A | 4/1999 | Landwehr et al. .......... 395/186 |
| 5,949,471 A | 9/1999 | Yuen et al. .................. 348/5.5 |
| 5,977,968 A | 11/1999 | Le Blanc .................... 345/339 |
| 5,987,415 A | 11/1999 | Breese et al. ............... 704/270 |

FOREIGN PATENT DOCUMENTS

| | | | |
|---|---|---|---|
| EP | 0101772 A1 | 3/1984 | ............ G07C/9/00 |
| EP | 0986213 A2 | 3/2000 | ........... H04L/12/28 |
| JP | 10214024 | 10/1998 | ............ G09B/9/00 |
| WO | WO9953464 | 10/1999 | ............ G09B/5/00 |

* cited by examiner

*Primary Examiner*—Daniel Abebe
(74) *Attorney, Agent, or Firm*—Gregory L. Thorne

(57) ABSTRACT

An interaction simulator, such as a chatterbot, is enabled to simulate an awareness of the user to generate an interaction that is more natural and appropriate than prior art chatterbots. For example, the device may employ machine vision to detect the number of persons present or the activity of the user and respond accordingly by interrupting its output or by inviting a conversation or other interaction when a user approaches. The device may modify its responses according to the user's activity, for example, by playing music when the user falls asleep or requesting an introduction when another user speaks. The device may also respond to unrecognized changes in the situation by inquiring about what is going on to stimulate interaction or generate new responses.

19 Claims, 11 Drawing Sheets

ENVIRONMENT-RESPONSIVE USER INTERFACE/ENTERTAINMENT DEVICE THAT SIMULATES PERSONAL INTERACTION

BACKGROUND OF THE INVENTION

1. Field of the Invention

The present invention relates to devices that simulate personal interaction with a user through various outputs modalities such as light pulsations, synthetic speech, computer generated animations, sound, etc. to create the impression of a human presence with attending mood, ability to converse, personality, etc.

2. Background

With increasing sophistication in technology, the variety of possible features and options associated with many appliances can be daunting. This phenomenon is exemplified by satellite and cable TV where the number of program choices is unwieldy in some cases. Many examples exist, including cell phones, personal computer applications, e-trading systems, etc. In such environments it is useful for the machines to take some of the routine work out of making choices from among an overwhelming number of options. However, often, the solutions are not much less painful than the problems they are supposed to address. For example, user interfaces that filter a large number of choices using custom templates for each user must be trained as to the user's preferences. For example, a user can enter his/her preferences by actively classifying his/her likes and dislikes ("customization"). This can also be done passively such as by having a computer process "observe" the selections made by the user over time ("personalization"). Such systems are discussed in a variety of patent applications assigned to Gemstar and Philips Electronics. U.S. Pat. No. 5,515,173 for System And Method For Automatically Recording Television Programs In Television Systems With Tuners External To Video Recorders; U.S. Pat. No. 5,673,089 for Apparatus And Method For Channel Scanning By Theme; US Patent U.S. Pat. No. 5,949,471 Apparatus And Method For Improved Parental Control Of Television Use. Another example is U.S. Pat. No. 5,223,924.

The user-interfaces that permit the specification of preferences, either explicitly or passively, are often sophisticated enough to be fun and intuitive. More and more such systems have evolved toward seemingly "smart" systems that try to seem like human helpers rather than control panels. For example, help dialogs in complex software applications such as Microsoft® Office® accept natural language sentences and give text responses quasi-synchronously with animated characters. Another example of an interface that accepts natural language questions is AskJeeves®, a search engine for the Internet.

User interfaces are evolving rapidly away from function oriented systems where a sequence of steps are performed, the last step of which results in the desired result, to object oriented interfaces which allow the user to manipulate the subject matter of concern providing immediate feedback on the results. The ultimate embodiment of this idea is non-command interfaces such as virtual reality environments that permit a user to manipulate controls and experience the effects rather than performing a prescribed series of steps to achieve a result. Agents are another type of noncommand interface. The eventual goal of some research is to provide highly intelligent agents that know all about the user's needs and lifestyle and can retrieve exactly the information required of the user at any given time. Practical embodiments of such noncommand interfaces are, however, not quite ready for introduction into practical products. One of the problems is that the software technology required is highly sophisticated and requires a great deal of programming and/or training. For now, computers still need to be told what to do and the dream of interfaces that are truly easy to use, those giving the impression of being "smart," are for most applications, still rather far off.

Computers that look smart without actually being smart, however, have been around for a while. A very different area of computer software development began in the mid-1960s with an MIT computer scientist Joseph Weizenbaum who created a simple program with no utility apart from how smart it appeared to be. It simulated the role of a Rogerian psychotherapist by attempting to draw the user out and encouraging the user to continue talking. This program was called ELIZA. Many users found ELIZA very convincing. Even Weizenbaum's secretary demanded to be left alone with the program. However, ELIZA's conversation is effective only as long as one is willing to accept the very passive conversational style of a Rogerian psychotherapist, in which either the "therapist" usually responds by repeating part of what the "patient" has said or by asking the "patient" to explain or elaborate on what he has just said. What makes ELIZA seem convincing is that it does not do this in a rote manner. If the user mentions his mother, for example, ELIZA might ask the user to tell "her" more about his family.

Below is a sample conversation reproduced from ELIZA:

User: Men are all alike.

ELIZA: In what way?

User: They're always bugging me about something or other.

ELIZA: Can you think of a specific example.

User: Well, my boyfriend made me come here.

ELIZA: Your boyfriend made you come here.

User: He says I'm depressed much of the time.

ELIZA: I'm sorry to hear you are depressed.

User: It's true. I am unhappy.

ELIZA: Do you think coming here will help you not to be unhappy?

User: I need some help, that much seems certain.

ELIZA: What would it mean to you if you got some help?

User: Perhaps I could get along with my mother.

ELIZA: Tell me more about your family.

User: My mother takes care of me.

ELIZA: Who else in your family takes care of you.

User: My father.

ELIZA: Your father.

User: You are like my father in some ways.

ELIZA: What resemblance do you see?

So far, virtually all these so-called conversation simulators have used a basic method that generates shallow responses based on template-matches (rules) without any real understanding. For example, the template: "I wish I were <x>"(where <x>represents any series of words) matches on the user statement: "I wish I were taller." The template is associated with the machine response: "Why do you wish you were <x>?" The machine responds with the statement: "Why do you wish you were taller?" What distinguishes one conversation simulator from another is not so much its sophistication and complexity as the size and variability of its database of responses. More sophisticated variants have a larger database of templates and responses including whimsical responses that can make them more interesting than the passive, flat responses of ELIZA.

Some conversation simulators provide information on specific topics, rather than general conversation simulation. For example, conversational simulators have been used for providing information regarding a particular topic. Basically, their libraries of responses anticipate questions about some subject and provide "canned" responses. Some conversation simulators have been programmed to appear as if they had a life story to relate. They would talk about their story when they could not come up with a good template match to keep the conversation going.

A typical conversation simulator may be described as having two parts: a user-interface shell and a database. The user-interface is a computer program that remains essentially constant irrespective of which personality or information database is used. The database is what gives the conversation simulator its personality, knowledge, etc. It contains the specific answers and information about questions for a topic. The database has pre-defined answers linked together by question templates. The realisticness of the conversation simulator depends on how well the creator of the database has anticipated the questions people are likely to ask and the patterns that are common to classes of questions with the same answer. The user-interface accepts questions from a person, searches through the templates and returns the (or a random of the) most appropriate answer (or answers) corresponding to it. The technology requires the author to create the typical database; there is no initial knowledge about natural language in the user-interface and the systems cannot learn on their own. The systems are not perfect and give gibberish or simply bail out when good matches cannot be found. But this is tolerable. In principle, a perfect database would work for every conceivable situation, but if per cent of questions are handled adequately, this appears to be enough to keep people interested.

Another approach to making conversation-capable machines employs more sophisticated "smart" technology, but as discussed above, these require too much complexity and/or training to be of use as a basis for a conversation simulator. Attempts, such as Mega Hal give the impression of actually being nonsensical. But the smart technology has its uses. An area of research called "computational linguistics," a branch of artificial intelligence attempts to develop an algorithmic description or grammar of language. This technology can be used to parse sentences and do things like identify the most important words in a sentence or identify the direct object and verb, and things like that. In fact, the research goes much further. Computational linguists are very interested in the technology required to make computers really understand what a person is saying: lexical and compositional semantics. This is the determination from speech (written or spoken), the meaning of words in isolation and from their use in narrow and broad contexts. However, programming a computer to distinguish an ambiguous meaning of a word is far short of what is required to make a computer subsequently respond appropriately, at least a verbal response.

The technology used successfully in conversation simulators typically works by matching the user's input against its database of templates. They choose a predefined template that "best" matches a user's statement and produce one of the template's associated responses. To describe this mechanism in more detail, it helps to use a specific example. For this purpose we will use Splotch, a program created by Duane Fields at Carnegie Mellon University, and whose source code is publicly available from CMU's web site. "Splotch" is a variation of "Spot", so named because it is sort of pet like, i.e., an ill-defined spot.

Splotch, like other such programs, works by template-matching. The user's input is compared with a database of templates. Among those templates that match, the highest ranking template is chosen, and then one of the templates's associated responses is chosen as output. The templates can be single words, combinations of words, or phrases.

A single template can include alternate words or phrases. For example the "money" template can also match on the word "cash". There is one other way that alternatives can be specified: a synonym dictionary. Before the user's input is matched against Splotch's templates, the words and phrases in the input are converted into canonical form. This is done by comparing them to words and phrases in the synonym dictionary and substituting the preferred form for all variants. Many of these variants will be alternative spellings, including misspellings. For example, "kool" in converted to "cool" and "gotta" to "got to". This enables a single template to match many alternative, but equivalent, words or phrases, without specifying these alternatives for each template.

Words or phrases in templates can be marked for necessary inclusion or exclusion. If a word or phrase is matched for exclusion, then there is no match on this particular template when this word or phrase is present. For example, Splotch would not match on the "business" template, if the phrase "none of your" was marked as having to be absent by being preceded by "!", e.g., "business:!none of your". On the other hand, when a word or phrase is marked for necessary inclusion, then a match fails if the specified word or phrase is absent. For example, the "gender:sex:&what" template will successfully match if the user's input includes either the word "gender" or "sex", but only if it also includes the word "what".

Furthermore, a template can have a variable. For example, the "Do you like <x>" template has a variable as its fourth term. The variable can be passed on to the response, e.g., "No, I don't like <x>". In this case all the words after "Do you like" would be bound to the variable. In the template, "Men are <x> than women", words between "are" and "than" would be bound to the variable.

Each template has an implementer-assigned rating. After Splotch has tried matching the user's response to all its templates, it chooses the template with the highest rating, and then responds with one of the responses listed with the template. The next time this same template is chosen, it will choose a different response until it has cycled through all listed responses.

Besides variables passed from the template, responses can have another type of "variable". These indicate place holders which point to alternative words or phrases. For example, the response, "My favorite color is @ color .w", indicates that the color is to be chosen randomly from a file, color .w, containing a list of color words. This allows a response associated with a template to be, in effect, many alternative responses. The phrases in the "@" files can themselves contain pointers to other "@" files.

Prior art conversation simulators tend to be repetitive unless they contain a very large number of installed template files. The large number of template files can be unwieldy. In addition, even with a large number of alternative templates, a conversation simulator remains static. For example, real people know that the USSR has been dissolved and no longer holds the romantic intrigue it once did in spy movies. A conversation simulator programmed much before 1989 would contain many templates that would produce responses that sounded odd if they came from a person.

Most prior art conversation simulators perform poorly in simulating a personality, if they do so at all. Hutchens' HeX, for example, was successful because it had a sarcastic, insulting personality. Certainly, prior art conversation simulators lack the appearance of a personality with any depth. A conversation simulator cannot simulate sharing in the way that people do in trusting relationships because they have no history and no experience to share; in addition to lacking the appearance of a personality, they generally lack the appearance of an identity as well.

Conversation simulators are often designed to encourage users to talk. Certainly that was the idea behind ELIZA, the progenitor of this class of program. But the tricks used to get users to talk can quickly become tiresome and predictable. One device for making conversation simulators interesting is to design the conversation simulator so that it provides factual or entertaining information. Since conversation simulators can't understand the semantics of user's queries, any attempt to respond to factual questions or declarations will often lead to inappropriate replies. Furthermore, a conversationalist that simply cites facts is soon perceived as a know-it-all and a bore. The most convincing conversation simulators encourage the user to talk and to respond more on an emotional than a factual level, expressing opinions and reacting to (e.g., supporting) the opinions and values of the user. This is not to say that the conversation simulator cannot be content-free while being convincing. Hutchens did a fairly adequate job in providing HeX with the sorts of information usually found in so-called small talk.

Another problem with conversation simulators is that they are easily thrown off the current subject by brief replies from the user. They do not have a sense of context and it is difficult to create a simulation of a sense of context. One solution is to provide some persistence mechanism by bringing up an old topic raised by the user using a template that requests a response from the user on that subject, for example, a question about topic <x>. But some conversation simulators that are claimed to be context sensitive will stick with a subject even if the user wants to change the subject.

Machine-learning schemes, in which new conversational content is learned from past or sample conversations, are unlikely to be successful. Such approaches generally produce novel responses, but these responses are usually nonsensical. The problem emanates in part from the fact that these techniques attempt to employ a large number of inputs to select from among a large number of outputs with a concomitant need for tremendous training and tolerance of unpredictability in the results.

Even for conversation simulators that are highly convincing, in the long run, they are essentially entertainment; a dissipative activity. Upon learning what they do, many people ask why someone would bother to spend time with a conversation simulator. Many who are initially intrigued end up bored, so even the entertainment value of conversation simulators is limited. Except for using the information gathered in a chat for filling in the blanks of response templates or, when computational linguistic approaches are used perhaps new phrase structures or ideas, all the data delivered by a user to a conversation simulator ends up going down the drain. Thus, all that data simply leads to more chat, but no new knowledge accrues and none is put to use. This adds to the basic view of conversation simulators as being interesting experiments, with very little practical justification.

Another problem with conversation simulators is that using them is not a very spontaneous and natural act. Currently there are no conversation simulators whose actions evidence a great deal of common sense, for example, that will know when to invite a user to engage in a session or when to stop, pause, or change the subject. Even if a conversation simulator had something particularly useful to say, there are no known strategies, proposals, or even the recognition of a need for providing a conversation simulator with such abilities.

An area of research that has generated technology that may be employed in computer programs generally is, so called, "affective computing." This is the use of computers to be responsive to human emotions and personality to create better user interfaces. For example, U.S. Pat. No. 5,987,415, describes a system in which a network model of a user's emotional state and personality are inferred and the inference used to select from among various alternative paraphrases that may be generated by an application. The approach is inspired by trouble-shooting systems in which a user attempts to obtain information about a problem, such as a computer glitch, using a machine-based system that asks questions to help the user diagnose and solve the problem himself. The approach can be summarized as follows. First, the system determines a mood of a user based on a network model that links alternative paraphrases of an expected expression. The mood and personality are correlated with a desired mood and personality of the engine that generates the feedback to the user. Mood descriptors are used to infer the mood of the user and the correlation process results in mood descriptors being generated and used to select from among alternative paraphrases of the appropriate substantive response. So, if there are two possible paraphrases of the substantive response by the computer (say, "Give it up!" or "Sorry, I cannot help you!"), the application will select the one that best corresponds to the mood and personality the programmer has determined to be desirable for the computer to project given the user's mood/personality. In summary there is a stochastic model used to determine the mood and personality projected by the user's response, then a model is used to link the user's mood and personality to a desired mood and personality to be projected by the computer. Finally, the paraphrase of the response that best matches the desired mood and personality is selected and used to generate the response using the same stochastic model in reverse.

The above user interface separates mood and personality from content. Also, stochastic models are notoriously difficult to train. Conversation simulators in the past have enjoyed great power and success in using rule-based systems.

Another technical approach for communicating the user's attitude to a computer is a manually-settable user-interface. The user may explicitly indicate his/her attitude, for example, by moving a cursor over a graphical image of a face to change a sad face into a happy face. This approach for creating a user interface is described in U.S. Pat. No. 5,977,968. The range of feelings that may be conveyed using such an interface, however is limited and it is difficult and unnatural to convey one's feelings in this way.

Another application area in which the user's emotional state may be determined by a computer is medical diagnosis. For example, U.S. Pat. No. 5,617,855 describes a system that classifies characteristics of the face and voice along with electroencephalogram and other diagnostic data to help make diagnoses. The device is aimed at the fields of psychiatry and neurology.

In still another application area, machines automatically detect a user's presence or specific features of the user for purposes of machine-authorization and authentication or convenience. To that end, some prior art systems employ biometric sensing, proximity detectors, radio frequency identification tags, or other devices.

Another system that inputs the user's emotional state is described in JP10214024 where a device generates scenes based on a video input. Information relating to the emotional state of the user is input from the user by a recognition system and used to control the development of a story.

SUMMARY OF THE INVENTION

An interaction simulator, is like a conversation simulator, but with a broader range of possible inputs and outputs. It is possible for people and machines to express themselves in ways other than by speaking. For example, a person can use gestures, remote controls, eye movement, sound (clapping), etc. Machines can flash lights, create computer generated animations, animate mechanical devices, etc. An interaction simulator is a more general term that encompasses the entire range of inputs and outputs that could be used to create expressive interaction between a user and a machine. Briefly, the invention is an interaction simulator that provides greater ease of use than prior art conversation simulators, enhances the quality of the interaction between user and the simulator, and increases the utility derived from interaction with the simulator. The invention also provides these advantages to the field of user interfaces for data storage and retrieval. To this end, the present invention is built around an interaction simulator that is responsive to the uniqueness of each individual's personality by automatically adapting itself to a particular user. In addition, a system and method employed by the interaction simulator provide a mechanism whereby simulator-initiated interaction is responsive to the user's situation, for example, a conversation simulator embodiment may cease talking, to avoid interrupting the user's monologue and stop talking if the user falls asleep. Further, the utility of the interaction simulator is extended by passively funneling useful information gleaned from conversations with a user into systems that can take advantage of the information. For example, an electronic program guide preference database can be augmented by extracting likes and dislikes from dialogues and applying them to the database. Such data may be elicited from the user responsively to the needs of the database. Still further, the interaction simulator model is extended to a range of input and output modalities. For example, a television with audio output and input capability may generate artificial speech with synchronized light or color in the cabinet of the television or a synchronized animation on the screen to attend the chat to provide the impression of a television that talks. The user's expression can be input to the interaction simulator by means of gestures, sound, body position, manual controls, etc. Still further the substantive content of the interaction simulator's output is enhanced by providing an ability to obtain information from regularly-updated data sources or live data feeds. The extraction of such information may be guided by data gleaned by the simulator from conversations and/or other interaction.

DETAILED DESCRIPTION OF THE PREFERRED EMBODIMENTS

Figure 1:
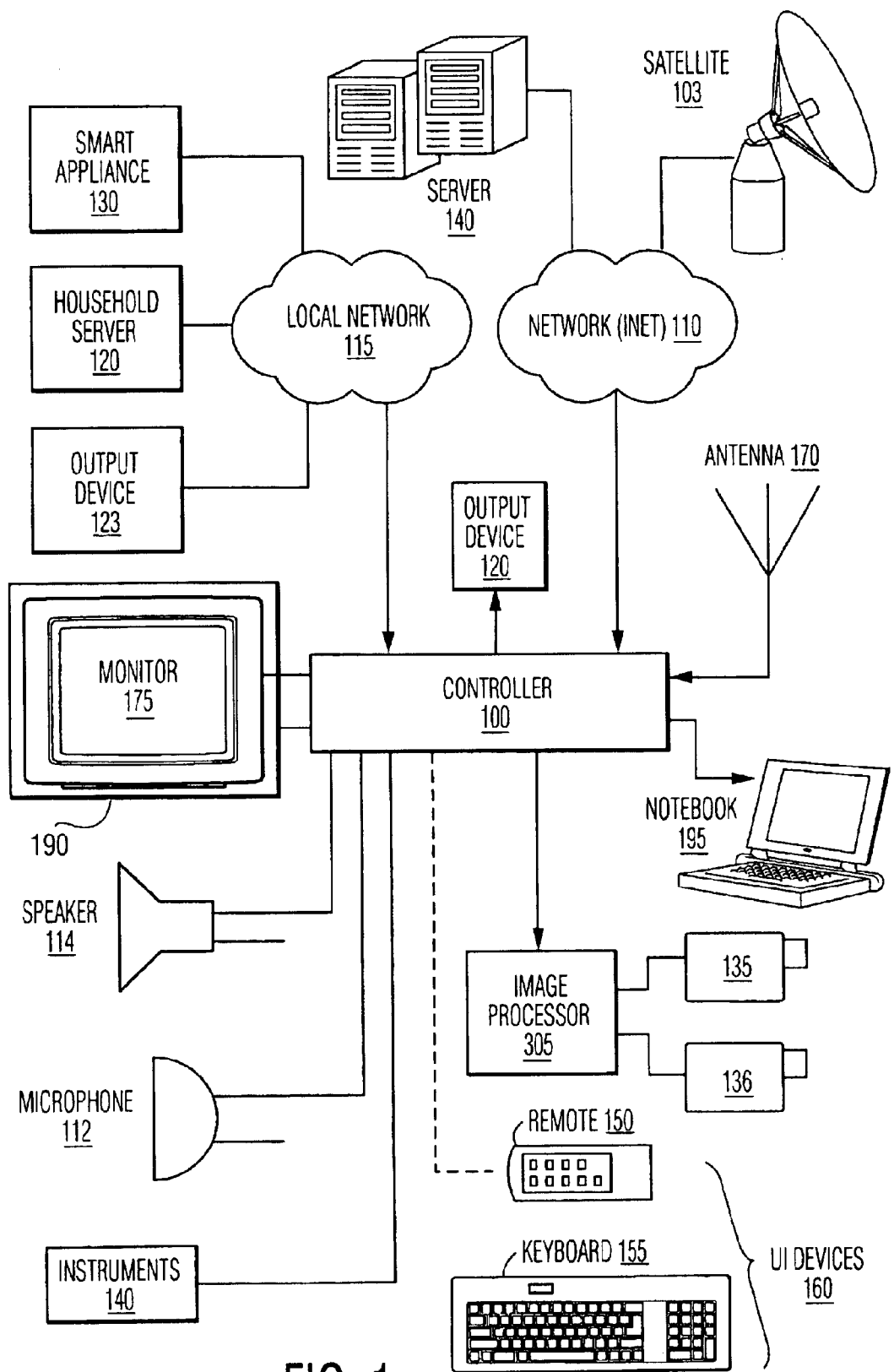
FIG. 1 is an illustration of a hardware environment in which an embodiment of the invention may be practiced.

The invention involves a combination of elements that represent a step toward making conversation simulator technology more useful. The prior art has proven that conversation simulators can be fairly convincing. The inventive features proposed herein build on this strength by augmenting it with other proven technologies such as machine-recognition systems that are capable of classifying features of their environments. The result is an interaction simulator that seems to have more common sense and is more human-like in its actions and more convenient to use. The inventive features further build on the persuasiveness of conversation simulator technology by exploiting the information interchange in useful ways, for example by augmenting a preference database or accessing further information from a data resource, like the Internet, to educate or entertain. These main drivers for the inventive features invite other issues which must also be addressed. For example, if a conversation simulator is going to become a useful staple in the electronic household or workplace of tomorrow, it must fit in without a struggle. These issues are addressed first.

To be convincing companions conversation simulators should preferably interact via speech and be able to respond in the social context provided by the user. Since companionship is a social relationship, conversation simulators must be able to exhibit socially correct behavior. According to an embodiment, this may be provided by supplying the interaction simulator with information about the particular user and rules that constrain the behavior of the simulator in a manner that provides an appearance of being mannerly and by giving the conversation simulator a consistent pleasing personality. To make the conversation simulators capable of responding appropriately to a particular user, the conversation simulator may be augmented by a system that allows it to recognize individuals allowing the conversation simulator to adapt to different users and to the same user over time.

Preferably, conversation simulators should employ audible speech as a means for input and output. Splotch, like most other conversation simulators, interfaces with the user via typed text. Speech output from text is a straightforward proposition except for the problem of flatness of the voices of current generation devices.

Several ways of mitigating this problem may be provided. First, instead of storing the standardized sentences and phrases (response templates) as simple text and outputting these through a text-to-speech converter, the inflection for these response templates may be stored along with their text. The inflection scheme may also provide representations for variables in a phrase or sentence.

Take, for example, a standard sentence EX1 from a template file:

EX1: Tell me, more' about, why" you, hate <x>.

The apostrophes indicate that the preceding word is spoken with emphasis. The quote indicates higher emphasis and the commas, reduced emphasis. The lack of a mark indicates moderate emphasis. The variable indicated by <x> is from a sentence spoken by the user. It lacks an accent mark because it is repeated with moderate emphasis. The emphasis for the variable phrase may be derived from a formula that is connected with the standard template response. Since the template is a question and usually would be expected to elicit information of an intimate and sensitive nature, the emphasis on the words in the variable may fall off at the end. So if the phrase is:

going to school, then the emphasis could be as marked with reduced emphasis on the last syllable. This contrasts with how the same variable phrase would be used in template sentence EX2.

EX2: What? You don't like <go"ing to school">

Here the emphasis is singsong and strongly emphasized. The system designer, according to his/her needs and priorities, may choose the particulars of the rules, but preferably, the rules should follow natural human patterns of speech for the relevant language. In the above example, it is possible to define rules even for variable phrases that cannot be known in advance. Rules for variable phrases may be unpredictable. However, the template sentence in which it is used provides information that can form a better rule than simply a standard one for providing inflection; thus, the falling emphasis rule for EX1 and the singsong rule for EX2. Note that while in the above examples, only one dimension of inflection is discussed, it is understood that inflection may involve pitch, loudness, timing, and other dimensions as well. These may be provided for by an appropriate scheme for handling these dimensions independently so that each syllable has a corresponding pitch-loudness pair.

There are several other ways to solve the problem of the inflection of speech not obtained from a fixed template. One way is to play an audio recording of the variable phrase back to the user. For example, if the user says, "I think my English teacher is completely out of her mind" the conversation simulator could play back "Why do you think your" followed by a recording of the user saying "English teacher is completely out of her mind." The quality of the voice can be digitally modified to mimic that of the conversation simulator interface. The drawback of this approach is that, in this example, it is likely to sound sardonic, because the user's sentence and the conversation simulator's sentence call for different inflection patterns. It is possible to modify the inflection pattern by modifying the sound data. Another alternative is for the conversation simulator interface to note the inflection and attempt to reproduce it (identically or modified, for example to form a question rather than the user's declaration) with its own speech generator.

Other issues arise in connection with speech understanding. One has to do with the problem of determining when the user has finished speaking so that it can respond at the expected time. The prior art text-based conversation simulator systems determine when a response is expected by simply indicating this, for example by entering a single or double carriage return. No such concrete indicator is available normally in spoken conversation. Yet, a conversation simulator that is a suitable companion should know when the user is yet to finish talking and avoid barging in. On the other hand, if the user barges-in when the conversation simulator is talking, the conversation simulator must be able to recognize this and stop talking, and respond appropriately. Several approaches may be used either individually or in concert.

1) A pause beyond a threshold interval of time may be used to signal the end of speech
   a) The threshold pause may be adjusted according to the user's pace of speech. Conversation simulators would respond more quickly, then, to fast talkers than to slow talkers.
   b) The threshold pause may be adjusted according to a comparison of the user's speech to an inflection template. Since sentences often tail off in emphasis at the end, this may be used to shorten the delay.
2) The conversation simulator may simply make its best guess according to the above scheme (or any other,) and, if it is interrupted by the user, simply back off and continue "listening." Preferably, the conversation simulator should back off as quickly as possible if it has begun responding.
3) The conversation simulator may generate a thinking sound like the word "Well . . . " or the sound "Ummmm . . . " or "Hmmm" to indicate it is about to speak. The user, if he/she is continuing to speak, would interrupt. This would allow the user to stop the conversation simulator before it responds substantively. These non-substantive sounds may provide a more innocuous pattern of speech followed by interruption than if the conversation simulator started generating substantive responses and was interrupted.
4) The conversation simulator program using any of the interruption-based schemes, could learn from the interruption feedback and adjust its pause threshold. It could look for cues from the particular user indicating that the end of his/her response has been reached by feeding, to an internal machine-learning process, inflection and timing patterns, visual cues such as gestures or facial expressions, or other inputs that might give the conversation simulator a more reliable indicator of when it should speak. These may also be programmed explicitly. The idea here is to take advantage of the interruption by the user as a feedback mechanism for a machine-learning process.
   a) Various inputs may be used for such a machine-learning process: loudness pattern, pitch pattern, and other inflection patterns, specific words like "well . . . ?" might be used frequently by particular users when they grow impatient with the conversation simulator's delay.
   b) The machine-learning scheme should be developed and stored respective of each user since one user's patterns would not necessarily be the same as another user's.
   c) Gaze information plays an important role in identifying a person's focus of attention. This information may be used to provide communication cues in the present system. For example, it can be used to identify where a person is looking, and what he/she is paying attention to. A user's gaze direction is determined by two factors: the orientation of the head, and the orientation of the eyes. While the orientation of the head determines the overall direction of the gaze, the orientation of the eyes can determine the exact gaze direction and is limited by the head orientation. Other cues may be derived from leaning forward (body postures), facial expressions and emotional state of the speaker. The emotional state of the speaker may be estimated from acoustic and prosodic features such as speaking rate, intonation, intensity, etc. Knowing the emotional state of the speaker is useful to indicate when the speaker is about to end his conversation.

5) The cue for when the conversation simulator should speak may come from the substantive content of the speech from the user. For example, questions can be identified by the substantive text of the user's speech as well as the inflection pattern and this may be relied upon by the conversation simulator as an indication that it is expected to respond. Certain statements or phrases may be classed by the conversation simulator's programming as indicating that the user is finished for the moment and wants a response. Examples are: "What do you think?", "Hmmm . . . !", "OK?"

a) The cue may be more subtle than simply classed phrases. Some sentences recognized by the conversation simulator may simply be more final than others. For example, "I don't think so." may be less final than: "Yes, that is what I think." because the former may be a prelude to an explanation while the latter is a confirmation of something said by the conversation simulator.

It may be preferable, in most contexts, for the conversation simulator to be interesting and non-repetitive. This can be provided in several ways. One is for the conversation simulator to generate the appearance of a personality. This, in turn, may be provided by programming it to respond on an emotional level as well as a factual level. However, to be a suitable companion these attributes need to be qualified. The interests, personality, and emotions of the conversation simulator must be supportive of the user. In this respect a companionable conversation simulator must be supportive like ELIZA, but it also must be interesting. Most conversation simulators tend to be either interesting (at least for a short period of time) or supportive, but not both. Part of the problem is that responses that are interesting often don't encourage the user to continue talking. One way to provide the combination of both interestingness and supportiveness is to provide double responses. It may, perhaps, make some relevant and perhaps witty comment about what the user has just said, and then offer support and encourage the user to continue or elaborate. This will require that a companionable conversation simulator have a large number of templates which recognize and respond to words expressing emotions, feelings, moods, and attitudes. For example, if the user says, "I hate meetings," the conversation simulator needs a template that matches on "I hate <x>" with responses like, "I don't like meetings very much either, they are so boring. What do you dislike most about meetings?" Ideally, the conversation simulator's intonation and speech should be consistent with the emotional climate of the conversation as well as the content of its replies. The depth and adaptability may go beyond just responding to certain phrases in the last utterance of the user. The conversation simulator may be given the capability of recognizing the emotional state of the user and respond to it, changing its responses as the emotional state of the user changes. For example, it may recognize when the user is sad or happy and when the user's emotional state changes from sad to happy. This can be provided by classifying the various features of the audio, the speech, the image of the user, and other inputs such as the pressure he/she applies to the keys on a remote control.

The audio signal contains information about the user that is not contained in the speech. For example, the loudness and pitch of the user's voice supply useful clues about the user's emotional state. Likewise background noises indicating activity, particularly repetitive activity like nervous twitching or crying may be discernable from the audio signal. An audio signal classifier may contain classification processes corresponding to respective audio signals thereby having the capability to identify certain sound characteristics even when they are superposed. Likewise, a video image of a scene in which the user resides can be processed and objects or events discernable in the video image may be classified to supply information about what is going on with the user. For example, continuous repetitive movement about a room could indicate worry. Finally, of course, the content of the speech can be analyzed for clues to the user's emotional state. A text-based feature of a mood classifier may be programmed to respond to frequent use of words of a negative nature by generating a signal indicating a negative or judgmental state. A dictionary may be provided with a mood vector for each entry. The mood vector may be defined as a weight for each mood class, the weight indicating the probability that the mood is indicated by the use of a corresponding word or phrase.

A weight of the output may be provided to indicate the confidence level of the mood classification. Thus, the alternative outputs may each be associated with a corresponding confidence level. The output signal of the mood classifier may be in the form of a vector with a confidence level for each alternative mood class. The mood class may be given a damping characteristic so that it does not change rapidly from one dialogue exchange to the next. For example, if a user has exhibited a state of melancholy for half an hour, but laughs momentarily, it may not be desirable for the mood signal to change too abruptly.

Response templates used by the conversation simulator may each be provided with a vector indicating the appropriateness of the template to the various moods. A net score for each alternative template competing to be used to generate the next response may be weighted by a dot product of the mood class vector and the template vector. Any other scheme where the mood indication is used to alter the choices for output templates may be used. The final decision of which output template to use in generating the conversation simulator's response may be altered by the alternative mood signals. Even though there may not be one mood that wins between two competing mood classes, the choice of template may still be improved. For example, a template that corresponds to either of two alternative moods, each with a low, but still substantial, confidence level may represent a good choice, even though the mood is defined with a high degree of ambiguity (i.e., two mood classes are equally probably). The method of U.S. Pat. No. 5,987,415 may be used to classify mood/personality.

The following table indicates a very cursory list of mood classes and some examples of indications that may be developed using current technology. For example, there are video-tracking systems capable of identifying and tracking the position of the head of user in a scene. Also, there are systems capable of performing video-based face recognition for purposes of bio-authentication which may be adapted to recognize mood classes as well. Note that the kinds of indicators that may be used may include sufficient, but not necessary indicators of the mood. For example, perhaps only rarely does a person throw both hands in the air when happy, but when the gesture occurs, there is a high probability that the gesture is associated with frustration or happiness.

| Mood Class | Indicators |
| --- | --- |
| Somber/melancholy | video: head is relatively stationary, looking downwardly, or moving periodically. audio: voice is soft, pitch is high indicating stress. speech: words indicate mood. |
| Giddy | video: repetitive or abrupt movement, shaking shoulders. audio: rapid speech, laughter. speech: words indicate mood. |
| Focussed and serious | video: still, looking directly at conversation simulator interface, if visual UI exists (e.g., animation). audio: normal regularly paced speech. Absence of laughter. speech: words indicate mood. |
| Frustrated/angry | video: head in hand, gestures of anger or frustration. audio: speech is emphatic and explosive. speech is unusually monotone. speech: words indicate mood |
| Happy/content | video: gestures indicative of happiness. audio: speech is sing song and word count is high. |

The conversation simulator, preferably, should have some knowledge of the personality of the user and adjust its responses accordingly. For example, the conversation simulator may be programmed to be more assertive with someone who likes interacting with a "Take-charge" personality, and to be more tentative with someone who doesn't. A personality classifier may build a persistent model of a given individual, first by confirming the identify of the user in each session, then by building on each exchange, using clues in the user's statement and his/her reactions to the conversation simulator.

Many personality typologies have been developed. Any number of these are associated with characteristic tests for determining the type to which an individual belongs. For example, Myers-Briggs is a four dimensional model with sixteen independent personality classes. The Big-Five or Five-Factor Model of Personality is another well-known model having a five-dimensional basis. Although the conversation simulator could provide the user with a test (which might provide for an interesting conversation enjoyable to the user) there may be indicators embedded in the ordinary discourse that may be used by the conversation simulator to classify the user. As mentioned, the classification may be persistent; a conversation simulator may maintain the classification over multiple sessions and only modify its conclusion by cumulating information over time. Similar methods could be used for determining the user's interests as well as personality. Keywords from the user's responses could be classified using standard learning techniques to support classification of interests and personality. Greater emphasis may be given to some key words than to others in forming searches for responses. For example, certain responses may be marked to indicate that the user's responses to those statements are of special relevance for determining the user's personality and interests. The key words resulting from these responses may be weighted accordingly. The weight of these key words may be increased according to how often they turn up in user responses (taking into account, as indicated, the conversation simulator responses that elicited them).

Also in addition to personality, objective indicators that may be used to improve output choices may be employed by a conversation simulator. For example, the user's gender, age, height, ethnicity, socioeconomic class, intelligence, etc. may all be defined and used in making choices for templates. The conversation simulator may also be programmed with other factual information about the user. It may know, for example, the user's name and what the user has been talking about so that it can stay on topic. It may also store the topics of previous conversations. Furthermore, it may be programmed to store the topics of interest to the user and given the ability to suggest these topics when the conversation lulls. Again, these are persistent variables and may be used in combination with a device for confirming identity, such as asking the user's name or using a biometric scheme such as a voice-print.

For users to be willing to talk about their emotions and feelings to a conversation simulator, the conversation simulator must build trust. One way to do this is by programming the conversation simulator to appear to be self-disclosing, i.e., revealing things about itself, especially "experiences" that "affected" it. This can be done by giving the conversation simulator a backstory, which it can tell about itself. A conversation simulator with a history will be more convincing and will be seen as having a stronger, realistic and/or compassionate "personality." The basic idea of a backstory has been used in conversation simulators in the famous Loebner competition. One programmer in a contest for conversation simulators, Whalen, created a story for his conversation simulator to reveal to the judges. The conversation simulator was programmed to keep coming back to the story, trying to catch the interest of the judges so that they would ask questions. The story was about the conversation simulator losing his job. This prior art strategy was a trick to try to induce the judges to ask questions. In the conversation simulator of the invention, the backstory is a device for creating a feeling of closeness and trust. The backstory may thus be designed to engender compassion or understanding or to allow the user to "identify with" the conversation simulator. One scheme is to define a number of backstories and rank their usefulness for each of the different personality classes. Thus, a backstory may be pulled from a library of backstories based not only on the immediate trends in the conversation but also on the personality of the user.

Once a conversation simulator has the capability of responding to the user's speech, social context becomes more important. Since the user is no longer required to be at the keyboard, the conversation simulator should be programmed to respond to the user or initiate a dialogue at appropriate times. The conversation simulator may be programmed to be responsive to the event of the user breaking in or to continuous speech to avoid interrupting the user and speak only when appropriate. If the user is a child, the conversation simulator may actually be programmed to teach the user better manners if the user does break in. Preferably the conversation simulator should respond to the presence or absence of the user such as when the user enters and leaves the room. Thus, the conversation simulator can greet the user when the user enters, and avoid generating speech when the user leaves the room or moves to a point that is too far away to talk without being loud. The conversation simulator should be responsive to whether the user is occupied or available.

To give the interaction simulator an appearance of conforming to social protocol, the various input modalities may be employed in concert. Once again, various classes of user behavior may be identified using video, sound, and speech data. One example is the user changing his/her body position to one consistent with sleeping, such as a recumbent body position and then becoming still and possibly snoring. In such a situation, the conversation simulator may be programmed to stop speaking. Another example is the user leaving the room. These are two straightforward examples that may be recognized by suitable image and audio processing algorithms.

To be realistic the conversation simulator may be given the appearance of having knowledge of the everyday world. For example, it may be provided with variable data corresponding to the current time, weather, and news headlines. These data may be used with output templates to form relevant sentences. If the TV is on, it may be provided with an ability to respond to the action in the TV signal. For example, it may laugh along with the laugh track, or display the appearance of a more serious mood in response to a melancholy tone in the background music. This may be provided by an ability to recognize laugh-track sounds and, for example, discordant music.

The conversation simulator may be provided an interface to data that may be used for new templates. The data source may be provided in various ways. One way is a live feed from formatted source. A connection through a network, switched line, radio-based, or other communication resource may be provided to link the conversation simulator machine to a source of new templates. The templates may be created based on new information such as current news, stock ticker data, weather, journal articles, etc. They may be manually created or automatically generated from variable templates. New templates may be stored on a server and delivered periodically to, or accessed by, the conversation simulator process. The templates may be stored locally or on a server. The templates may be organized like a library so that information about the personality profile of the user(s) may be used to guide the access to the templates, whereby the most appropriate new templates are accessed by a given conversation simulator client. The templates need not be stored in their entirety. It is possible to define variable templates with library data being used to fill in the blanks. For example, a variable template may consist of a sentence, "Have you heard <x>?" The variable data may be stored in a record along with a token indicating which templates with which it may be used. The conversation simulator process obtains this information and uses it to create an utterance. Other variations on this basic idea are possible and would be apparent to those of ordinary skill.

Another way to update templates is via a feed from an unformatted source. The data used for new templates may be created not from a library whose structure and organization are intended to be used for this purpose, but from any data source, for example, an agent that scours the Internet for data relating to a particular topic. Suppose, during a conversation, the user indicates that he particularly likes a certain composer. The conversation simulator process may be programmed to generate an agent that searches for information on the Internet relating to that composer. A data parser and filter may identify sentences in the unprocessed links, which relate to the composer, and fill in template sentences (such as "Did you know <x>?") to use in dialogues. The data parser may employ similar template-matching algorithms such as used in current generation conversation simulators. Alternatively, it may be employ methods from the field of computational linguistics to extract information that is both relevant to a particular topic and which can be used to generate a particular output pattern. Note that this process is not limited simply to speech. The conversation simulator may obtain graphics, music, and other media and employ them in interactions. An example of such a use is a digital clip of the composer's music "played" by an animated character that represents the conversation simulator. These non-speech multimedia variations will become clearer from the description of the conversation simulator system in what follows.

What makes a conversation simulator convincing, to a large extent, is the quality of its responses, and quality follows the size of the database of templates (including responses). Currently, creating new templates is a rather cumbersome process. Although there are ways of specifying variations, these are quite limited. Hence most variations on a possible expression need to be expressed as alternative templates. For example, the template "I like <x>", where "<x>" is a variable will match on "I like horses", but it will not match on "I really like horses."A separate template may be created for "I really like <x>."Of course, this can be very cumbersome. But the problem isn't simply one of inefficiency. Often the template syntax is not expressive enough. For example, templates can match on only one variable. A lexicon that provides for such flexibility is desirable.

The template syntax may provide the ability to handle alternative necessary conditions. For example, in Splotch, currently, one can specify necessary conditions by prefacing with the symbol "&". While Splotch does not provide a way to specify alternatives to any condition, except by creating separate templates for each alternative, the template syntax may be enhanced so alternative necessary conditions can be specified. A label may be used to identify disjunctive terms and these may be demarcated into groups with parentheses, separation connectors, etc. to create complex logical conditions such as may be defined using a good search engine. A good example of a scheme is the one used for searching the Lexis® database. Exceptions may be provided to eliminate false-matches to conditions specifying matches to non-adjacent words, thus allowing for non-relevant words that can be ignored, as in the "I really like" case above. The syntax ignores word order. For example, by specifying that "I" and "like" are necessary for a match, the template would match on "I like", "I really like", and "I very much like", but it would also match on "Like I", as in "Like, I don't think you are making sense." The template syntax may be enhanced so that non-relevant words can be ignored but without ignoring word order. For example, specific exceptions could be added to exclude "Like I"(word-order sensitive) from generating hits with the "I" & "like" template. One other possibility would be to simply have a rule specifying that necessary conditions must be matched in order. Another possibility would be to have routine, very much like the "expand" routine which substitutes canonical synonyms for variations in the user's input, that eliminates words that are not very important.

Key word extraction need not be limited to template-matching techniques. Known natural language techniques may be used to identify the key words and phrases in spoken and typed sentences.

Often it is important to know whether the user is asking a question, since the response will be different if a question is being asked. Whether a question is being asked can often be determined by the first word in the sentence, e.g., it begins with "why", "what", "where", "how", etc. A conversation simulator may be programmed to determine if the user's input is a question. In Splotch, one way of implementing this is to create a routine somewhat like the expansion routine, but it recognizes questions instead of synonyms. This process should then modify the user's input with some question marker such as the symbol "qqq" so that templates can be made to match on this. This makes it easy to write templates that only match on, and respond to, questions. In a speech-based system, natural language or template-matching techniques may be used to identify questions. The same technique (as with questions) may be used with emotion-laden words: a routine may determine whether the emotion and attitude words are directed toward the conversation simulator or some other subject. Visual cues and/or identifiers (e.g., names) may be used to indicate the object or entity (the conversation simulator or someone/thing else) to which the user refers. This is important information for determining the type of response.

Templates may be prioritized by criteria going beyond simply the goodness of fit to the words in user replies. For example, Splotch is programmed to choose, between two equally satisfactory alternatives, the one that has more content. These matches make Splotch seem more intelligent, but they also can be conversation-killers. On the other hand, responses that tend to encourage the user to continue talking, such as "Tell me more," can be rather boring and repetitive. One possibility is to divide the responses into two classes: responses (comments) that indicate understanding, and responses (elicitors) that help continue the conversation. Then output can sometimes consist of combining the two types of responses, e.g., a relevant aside plus encouragement to continue talking. The majority of responses may consist of both types of responses: a comment on what the user said and a response that elicits the user to continue talking. For example, one can always say, "That was interesting. Tell me more." However, sometimes the eliciting response will be specific enough that no comment will be necessary. For example, a "why" question will elicit a response and it can contain enough content to indicate that the conversation simulator "understood" what the user was saying, e.g., "Why are you mad at your sister?"

One way of implementing this mechanism is to divide the templates into those with responses that are comments and those with responses that elicit further input from the user. The template matcher may select the highest matching template from each class, and determine if it were appropriate to reply with a double response or a single response that elicited more information. Alternatively, each template could have both kinds of responses attached to it, and two responses could be chosen, one from each list. The latter approach makes it easier to combine responses, since presumably the responses on the two lists would be compatible. However, the former might be less cumbersome and more flexible for writing templates since one wouldn't always have to come up with both types of responses for every template.

The information used for selecting priorities may include the personality class of the user, the currency (like the publication date of news data in a template, for example), the circumstances of the user (Is the user sleeping, for example?), the emotional state of the user, etc. Of course the output generation need not employ two different processes, one for selection of candidate output templates and one for choosing among them.

Most conversation simulators, including Splotch, do not have a sense of context. They respond to whatever the user has said in his most recent response. If this response is a one-word response, like "yes" or "why", the conversation simulator does not know what the user is talking about. One way of adding context is to include, in the list of matched templates, those templates that have been matched to the last several user responses. In order to prevent old, high priority templates from totally dominating the conversation, the priority of previously matched templates may be temporarily adjusted downward so that previously matched templates may eventually fade from the conversation unless something the user says refreshes them. This would give the system an impression of having a short-term memory. As discussed above in connection with classifying the user's personality, the system may be given a long-term memory by making the more permanent adjustments to the template priorities associated with personality classes and other permanent features of the particular user.

The priority adjustment scheme discussed above, whereby the suitability of a particular template is determined, in part, by personality classification, may also be used in the context of keeping on the current subject of discussion. Any of a variety of techniques may be used. The templates may be stored with canonical key word descriptors and indexed to permit searching. A search vector may be formed with key words and other current classifications, such as mood, personality, audio, etc. to find the current templates. The key word portion of the search vector need not be an ordered set of key words. The key word portion may include connectors such as proximity connectors, required words, and alternative words.

If the user frequently brings up certain topics, then templates that are triggered by these topics may have their priorities increased so that they are more likely to be selected in future conversations. Furthermore, those templates with diverse responses may have their response priorities adjusted, increasing the priorities of any responses related to favored topics. However, an additional mechanism may be used when the conversation lulls and a new topic needs to be injected into the conversation. Without some match with a keyword, these templates will not be in the list of potential templates. One remedy is to inject information from a user-profile database that has been built for a particular user. This database may contain keywords from previous conversations, which could be augmented with data from external data resources accessed, for example, through the Internet. Many responses have random variables. For example, the response "My favorite color is @color.w" tells Splotch to randomly pick the color from a list of colors. Such choices could be prioritized based on the user's personality or interests.

Any mechanism that discriminates among responses for a chosen template creates the danger that the same responses are repeated. To overcome this, once a response is chosen it may be marked so that it won't be chosen again for some time. In the case of random variables, the probabilities could be adjusted so that they are not uniform. Thus, each response may be marked by an indicator indicating how recently it was chosen. Then this information may be used to insure it is not re-used for a period of time so that, even though chosen somewhat at random, responses do not repeat in quick succession.

Adjusting the priorities can use supervised or unsupervised learning. Unsupervised methods for creating new templates—methods for examining past conversations and generating new templates—tend to produce nonsensical responses. However, it might be possible to learn new responses to old templates, as opposed to new templates, in an unsupervised fashion. Instead of training the conversation simulator on sample conversations to learn new templates, such training could be used to learn new responses. Whenever a template with a fairly high degree of specificity matched some part of the conversation, the other person's response may be added to this template's's responses. Of course, criteria need to be specified for deciding how specific the template has to be and how close the match has to be.

Currently, when there are no matches, Splotch chooses a default template whose response is either a vacuous comment like "I understand" or some unrelated witty remark. These reactions could be adapted by adding responses which are topics that have been popular in the past. For example, the response "Would you like to talk about movies?" could be added to the default template if "movies" has been a favorite topic in the past.

Also files that contain random variables (e.g., @colors.w) could have new variables added based on the user's responses to specific queries. In addition, information from databases might be useful for filling in random variables. Generally speaking, conversation simulators must not answer complex factual queries to avoid revealing their limitations. Answering such queries depends too much on language understanding, and in any case, a conversationalist that tends to respond by reciting facts is likely to be perceived as a bore. However, databases might be useful in helping the conversation simulator to express its opinions, by using relational information, e.g., knowing that since the user likes x, he might like y because x and y are both z. This information could be used to enable the conversation simulator to have similar tastes as the user.

A conversation simulator that is sensitive to the social context and which can adapt to the user's responses may be more convincing than one that is not because a conversation simulator does not have to have deep understanding. It can sustain a conversation by encouraging the user to talk and by occasionally responding in such a way that it creates the illusion that it understands what is being said. Furthermore, the more successful it is at getting the user to talk, the more difficult it may become to maintain the illusion of understanding. If the user responds with a short sentence, there are only a few keywords to respond to. But if the user responds with a long discourse, there are many possible keywords that might trigger a response. Responding to the wrong keyword may give the impression that the conversation simulator is not paying much attention, or worse, does not comprehend what is being said. If this is the case, then the user may be reluctant to do most of the talking, and start querying the conversation simulator to see if it really is paying attention.

True speech recognition depends upon natural language understanding. Of course, the conversation simulators manage to be convincing by fooling the user into believing that they understand what is being said by using rules to generate responses that are sensible. However, natural language technology may still be used to a limited extent to help a conversation simulator to recognize the particular meaning of word from a larger context or to grammatically parse a sentence. Thus, a rule-based template approach may be used where necessary to choose among responses, while the more sophisticated, training-intensive network techniques may be used to determine the correct canonical terms to represent the variables in a sentence and to parse a sentence, for example, to distinguish the direct object from the verb. In the final decision as to which of a large number of responses to generate, the conversation simulator is most convincing if it relies on predictable and fairly uncomplex selection rules.

Referring to FIG. 1, a conversation simulator operates as a program running on a controller 100. The Controller 100 may receive input from various sources for example, a connected notebook 195, an image processor 305 connected to cameras 135 and 136, conventional user interface devices 160 such as a remote control 150 and the keyboard 155. Other input devices may include a microphone 112, various instruments 140 such as temperature sensors, position sensors, security switches, proximity sensors, electrical load sensors, ambient light sensors, and alternative user interface devices such as a mouse (not shown separately), etc. Data may be gathered by the controller 100 through local or wide area or Internet networks 115 and 110. Devices connected to the local network 115 may include smart appliances 130, a household server 120, or output devices 123, which may include displays, audio outputs, wireless devices (not shown separately), etc. The household server 120 may store data such as inventory data for perishable goods and food, other supplies such as used for arts and crafts projects, materials used for hobbies, etc. The smart appliances 130 could include a microwave oven with an interface such as a bar code reader and a display, a television set, a stereo (not shown separately), etc. The controller 100 may directly output through a monitor 175. The monitor may include a cabinet 190 that has light and pattern output elements to permit the cabinet's 190 appearance to be changed by the controller 100.

Figure 2:
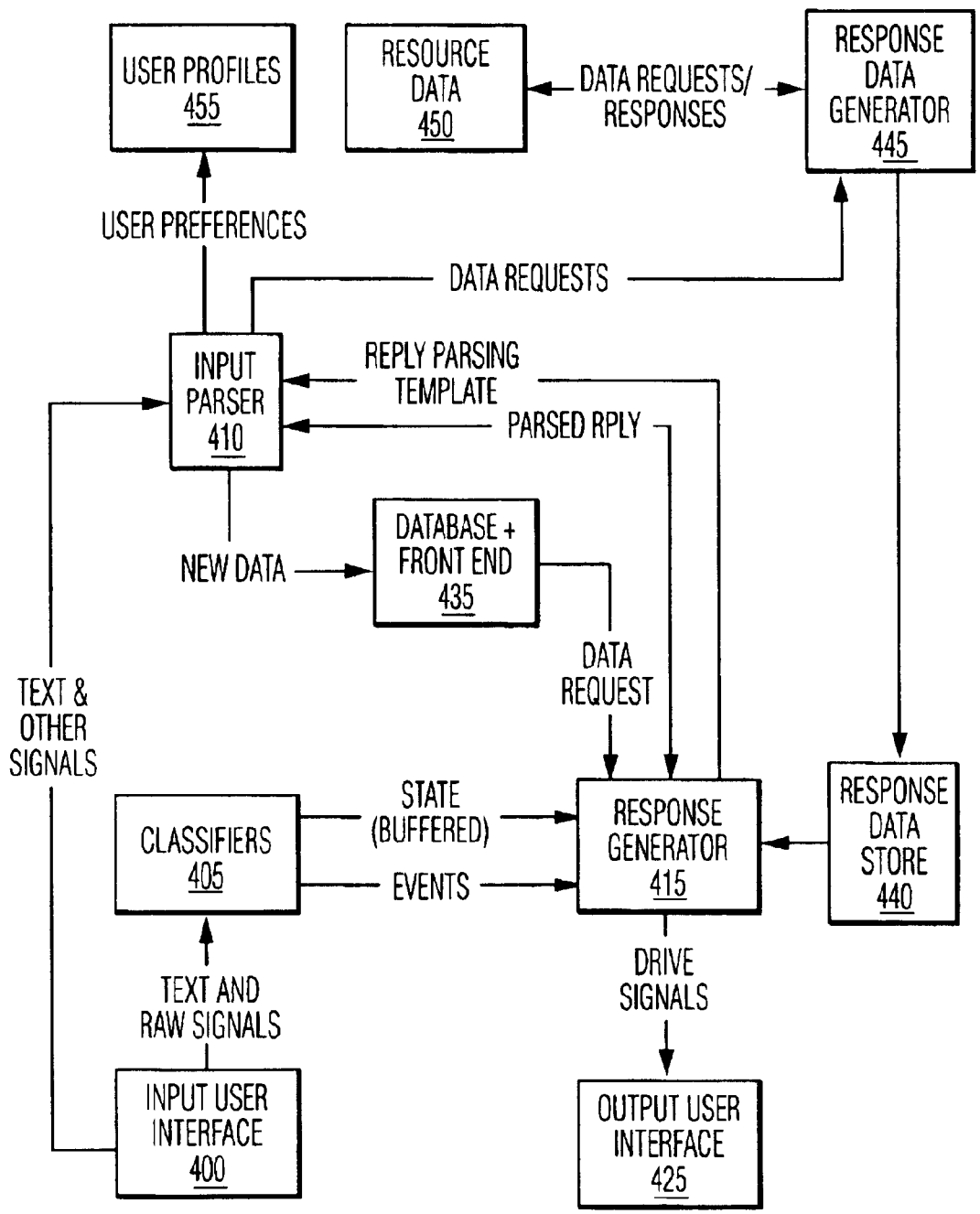
FIG. 2 is an overview of a functional diagram illustrating data flow between processes in a software system that may be used to practice the invention according to an embodiment thereof.

FIG. 2 shows a functional diagram of an event driven architecture that may be used to produce interaction with a user including the simulation of a conversation. Information about the user is received by an input user interface 400 process that takes in data such as audio, text derived from speech, video, control devices such as a keyboard, mouse, hand-held controllers, etc. The data received is classified by classifiers 405 which identify events requesting a response from a response generator 415. The information received by the input user interface 400 is also applied to an input parser 410, which gathers intelligence, such as sentences uttered by the user, parses and filters it, and applies this intelligence to the response generator 415. Each time an event is signaled by the classifiers 405, the response generator 415 takes state information from the classifiers 405, such as the mood of the user, the user's attention level, personality, interests, etc., and generates a response. Some of the state information may be determined in part by previous state information. For example, the personality of the user would be such a state. If the classifiers 405 indicate a spoken response is required from the conversation simulator, the response generator 415 selects appropriate data from the response data store 440 and signals the output user interface 425 to output synthetic speech corresponding to the response. This data may command an animation driver 260 in synchrony with the speech, a flashing light, or any other type of final output device or driver. A response data generator 445 receives data requests from the input parser 410 for example a request for information about a favorite actor of the user. The response data generator 445 generates an agent 205 to obtain the information from a data resource, such as the World Wide Web, and creates a data module from which the response generator 415 can generate a response to be used at a later date or contemporaneously with the request. This response data is stored or conveyed in the response data store 440. When a response is generated, the response generator 415 may optionally signal the input parser 410 to indicate what is expected in a reply (from the user) to the computer's response to aid the input parser 410 in parsing the reply. This may be in the form of a template for helping the input parser 410 in recognizing the reply.

Figure 3:
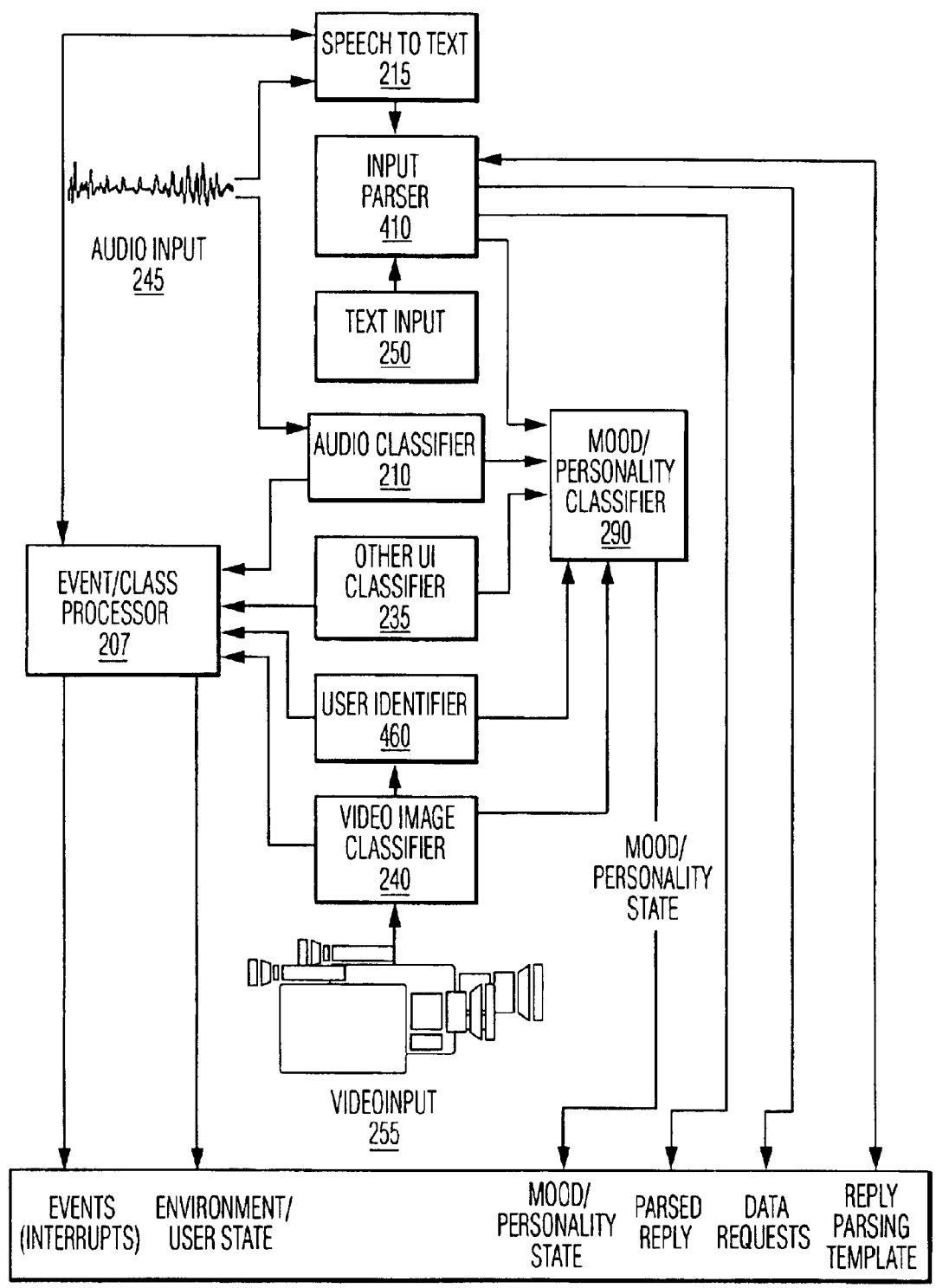
FIGS. 3–5 collectively form a more detailed representation of the flow chart of FIG. 2.

Referring now also to FIG. 3, again a functional block diagram, the classifiers 405 and input user interface 400 of FIG. 2 are shown in greater detail. Once again, also, the diagram of FIG. 3 represents a functional architecture that can be used to implement the various features of the invention and is by no means the only way to achieve them within the scope of the inventive system. Audio input video input 255, and other user interface devices (not shown) generate signals that are applied to respective classifiers. The audio input which may be received by a microphone (not shown) or a directional audio detector (not shown) which indicates both the sound and its direction, or any other suitable audio transducer, is applied to an audio classifier 210. The latter data form a real-time signal, which the audio classifier 210 classifies by suitable digital or analog means or a combination thereof. The audio classifier 210 then generates a current state information signal which it applies to both a mood/personality classifer 290 and an event/class processor. For example, audio classifier 210 may be programmed to recognize the beginning of an utterance and in response, generate a signal which ultimately results in the halting of the generation of speech by the conversation simulator, thereby preventing the conversation simulator interrupting the user. The audio classifier 210 may distinguish certain sounds such as the switching on of a light, the sound of snoring, the sound of a radio, the sound of many people speaking simultaneously, etc. It may also determine whether there are multiple sound sources generating sound, whether the sound is speech or not, whether the sound is a machine like a vacuum cleaner, or a radio playing. Each of these events and/or states may be combined with a demarcating time stamp and the combined signal applied to the event/class processor 207. The event/class processor 207 combines state information from multiple classifiers to generate an environment/user state signal indicating the current status of the system's environment, including the user, and also generates event signals (interrupt signals) to ensure an instant response when certain events are recognized by the classifiers. The recognition of events may require state information from multiple classifiers, so the event/class processor 207 combines state data from multiple classifiers to generate a combined state signal and a combined event signal. The environment/state signal may include an indication of all the possible event classes the various classifiers are capable of identifying or only those surpassing a threshold level of confidence.

A video image classifier 240 receives video input 255, classifies image data and generates state information signals which are applied to the mood/personality classifer 290 and the event/class processor 207. The video image classifier 240 may be programmed to provide, for example, the coordinates to which the user is pointing, indications corresponding to sign-language gestures, a count of the number of people in field of view, the identity of the user, etc. Video processing techniques from various fields such as authentication, gesture control of machines, etc. may be employed in the current system according to the particular aims of the system designer. The other output devices (not shown) apply their inputs respectively to other UI classifiers 235 which apply their output signals to the event/class processor 207. The other UI classifiers 235 may include typical computer controls such as hand-held remote controls, mouse, keyboards, joystick, etc. They may also include instrumentation monitoring the environment such as ambient light level, time of day, temperature of the room, security status of a building, galvanic skin response sensor, heart rate sensor, pressure sensing of the keyboard or remote control keys, etc. Any user interface devices generating direct text input 250 may apply text data to an input parser 410. Text data may also be obtained from a speech to text converter 215 which receives the audio input 245 and converts it to text. When obtained from audio, the text may be time-stamped by the speech to text converter 215.

The speech to text converter 215 parses the text using grammatical or structural rules such as used in prior art conversation simulators, as used in natural language search engines, or other suitable means. The result of this parsing is the extraction of data that indicates a type of input text (the phrase, sentence, or utterance from the user), particular variable data that may be extracted from the input text, and data requests corresponding to the input text. The input text is parsed, optionally using straightforward rule-based template matching, as in prior art conversation simulators. Rather than simply link this form to a particular response, as in prior art conversation simulators (although that may be the ultimate result depending on how the response generator 415 is programmed0, the text input template is used to extract particular information from the input text. This will be described in terms of the rule-based template matching method described in detail herein, but may be done using other natural language systems. For example, if the input text is found to correspond to a particular text input template, this may correspond to one or more output templates to be used by the response generator 415 The text input template may also indicate particular words or phrases to be used for obtaining information from, or adding information to, an external data store. For example, suppose a rule has been defined by the programmer of the conversation simulator indicating that it fits a response such as "I am a big fan of Shakespeare." The rule might be the word "I" in a certain proximate relationship to "fan" with certain exclusion rules to prevent false positive matches. One or more further rules may be used to identify the direct object of the sentence, which is "Shakespeare." The latter rule or rules may be defined specifically for the matching of text input templates or may be general rules or other methods. The matching text input template may correspond to data request, which the input parser 410 generates. The data request, in the Shakespeare example, may be a request for additional information about Shakespeare. This request may be applied to the response data generator 445 (shown in FIG. 2 and discussed in more detail below) which may obtain data from an external source and this data used by the response data generator 445 to form new output templates. This process is discussed in more detail in connection with FIG. 4.

The mood/personality classifer 290 receives signals from the various classifiers and processes these to generate a mood/personality state signal. The mood/personality classifer 290 may be a trained neural network, a Bayesian network, a simple rule-based system, or any other type of classifier capable of taking many different inputs and predicting a probability of the user being in a given emotional state and having a given personality. The personality signal, preferably, is the result of many observations of behavior and would tend to persist over time. Various personality and mood typologies may be used, running from simple to complex. An example of set of rules for classifying a user as bored is:

low sentence/phrase word count (the user's sentences contain few words) (input parser 410 signal indicating response word count), a low incidence of words suggesting enthusiasm such as superlatives (input parser 410 signal indicating adjectives), a quiet flat tone in the voice (audio classifier 210 signal indicating modulation inflection intensity), a lack of physical movement (video image classifier 240 signal indicating , etc., low pressure on the remote keys, little movement of the head or body, sighing sounds, etc.

looking at watch.

lack of eye contact with object identified with conversation simulator (for example, a speech-synchronized animated character).

Each of these may be classified by the indicated classifier. The color of the user's clothes, the pitch of the user's voice, the number of time the user enters and leaves the room, the way the user gestures, etc. all may provide clues to the user's emotional state and/or personality. The "Big Five" personality typology or the much simpler valence/intensity emotional state typology suggested in U.S. Pat. No. 5,987,415 or any other suitable typology may be used.

For immediate mental states also, any suitable framework may be used. The following tables summarize the Big Five which is an evolutionary outgrowth of the Myers-Briggs typology. There are many academic papers on the subject of modeling emotional states and personalities and many of these address the issues of machine classification based on voice, facial expression, body posture, and many other machine-inputs. Even the weather, which may be obtained using an agent over the Internet or via instruments measuring basic weather data such as daily sunshine, may be used to infer mental emotional state.

The Six Facets of Negative Emotionality (adapted from Costa & McCrae, 1992) with Anchors for the Two Extremes of the Continuum

| Six Facets of Negative Emotionality | RESILIENT R+– | REACTIVE R– |
|---|---|---|
| Worry | Relaxed; calm | Worrying; uneasy |
| Anger | Composed; slow to anger | Quick to feel anger |
| Discouragement | Slow discouraged | Easily discouraged |
| Self-Consciousness | Hard to embarrass | More easily embarrassed |
| Impulsiveness | Resists urges easily | Easily tempted |
| Vulnerability | Handles stress easily | Difficulty coping |

The Six Facets of Extraversion (adapted from Costa & McCrae, 1992) with Anchors for the Two Extremes of the Continuum

| Six Facets of Extraversion | INTROVERT E– | EXTRAVERT E+ |
|---|---|---|
| Warmth | Reserved; formal | Affectionate; friendly, intimate |
| Gregariousness | Seldom seeks company | Gregarious, prefers company |
| Assertiveness | Stays in background | Assertive; speaks up; leads |
| Activity | Leisurely pace | Vigorous pace |
| Excitement-Seeking | Low need for thrills | Craves excitement |
| Positive Emotions | Less exuberant | Cheerful; optimistic |

The Six Facets of Openness (adapted from Costa & McCrae, 1992) with Anchors for the Two Extremes of the Continuum

| Six Facets of Openness | PRESERVER O–– | EXPLORER O+ |
|---|---|---|
| Fantasy | Focuses on here and now | Imaginative; daydreams |
| Aesthetics | Uninterested in art | Appreciates art and beauty |
| Feelings | Ignores and discounts feelings | Values all emotions |
| Actions | Prefers the familiar | Prefers variety; tries new things |
| Ideas | Narrower intellectual focus | Broad intellectual curiosity |
| Values | Dogmatic; conservative | Open to reexamining values |

The Six Facets of Agreeableness (adapted from Costa & McCrae, 1992) with Anchors for the Two Extremes of the Continuum

| Six Facets of Agreeableness | CHALLENGER A– | ADAPTER A+ |
|---|---|---|
| Trust | Cynical; skeptical | See others as honest & well-intentioned |
| Straightforwardness | Guarded; stretches truth | Straightforward, frank |
| Altruism | Reluctant to get involved | Willing to help others |
| Compliance | Aggressive; competitive | Yields under conflict; defers |
| Modesty | Feels superior to others | Self-effacing; humble |
| Tender-Mindedness | Hardheaded; rational | Tender-minded; easily moved |

The Six Facets of Conscientiousness (adapted from Costa & McCrae, 1992) with Anchors for the Two Extremes of the Continuum

| Six Facets of Conscientiousness | FLEXIBLE C– | FOCUSED C+ |
|---|---|---|
| Competence | Often feels unprepared | Feels capable and effective |
| Order | Unorganized; unmethodical | Well-organized; neat; tidy |
| Dutifulness | Casual about obligations | Governed by conscience; reliable |
| Achievement Striving | Low need for achievement | Driven to achieve success |
| Self-Discipline | Procrastinates; distracted | Focused on completing tasks |
| Deliberation | Spontaneous; hasty | Thinks carefully before acting |

The mood/personality classifer 290 outputs a state vector, with a number of degrees of freedom, that corresponds to the models of personality and mental state chosen by the designer. The mood/personality classifier 290 may cumulate instantaneous data over a period of time in modeling personality, since this is a persistent state. The mental state will have more volatile elements.

Figure 4:
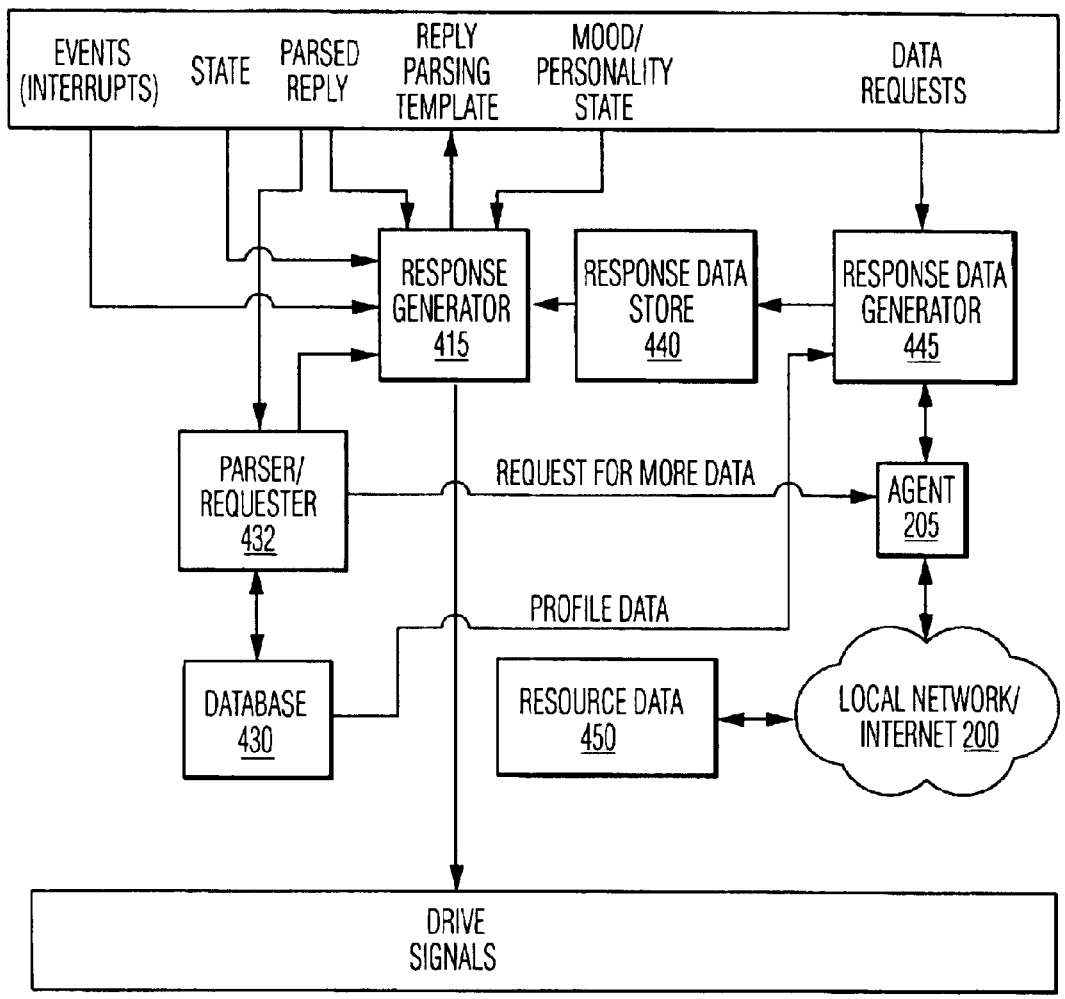

Referring now also to FIG. 4, the response generator 415 receives the mood/personality state vector and parsed reply data from the mood/personality classifer 290 and input parser 410 respectively. The response generator 415 also receives the environment/user state signal and events signal from the event/class processor 207. The response generator 415 also receives a data request signal from a parser/requester 432 linked to a database 430. The response generator 415 selects a response from the response data store 440 based on the parsed reply from the user, the mood/personality state, the environment/user state, and the events signal.

The parser/requester 432 does three things: it examines the parsed replies from the user for information that it can add to the database 430 to update it, it generates requests for further information about a topic as indicated by its programming, and it determines what data the database 430 requires to make it more useful. If a parsed reply provides data that the parser/requester 432 is programmed to recognize as useful in updating the database 430, that data may be extracted by the parser/requester 432 and added to the database 430.For example, if the database 430 is a user profile containing preferences of the user relating to television programming and the user says "I like Pokeman," during a conversation simulator session, the parser/requester 432 may add the key word "Pokeman" to the database 430. The parser/requester 432 may also generate a request for further information from a data source (represented by resource data 450) by instantiating the agent 205. For example, the agent 205 may obtain text from an Internet site indicating the names of Pokeman characters. The parser/requester 432 may extract these character names and add them to the profile data in the database 430.

If the database 430 accumulates a large amount of preference data, but discovers an ambiguity that can be clarified by asking a question, the parser/requester 432 may generate a data request and apply it to the response generator 415 so that a response may be made at some point by asking the user to clarify. For example, the database 430 may indicate that sports programs are watched frequently, but the data may be unclear as to which sports are favored. The database 430 may also contain standard data requests that can be filled progressively over time by having the conversation simulator ask questions intermittently. This is the analog of filling out a form, but the user need never know that this is what is happening. In the example where the database 430 is a profile database for an EPG, there may be a standard set of setup information, perhaps otherwise handled by filling out a form of customization data. This may be handled by the conversation simulator by simply generating templates that request the relevant data and occasionally inserting a question from among these templates into the conversation and retrieving the relevant data from the user's replies.

Other examples of database 430 are a smart card with investment information and an external database (linked via the Internet) containing the user's monthly payees where interaction with the user results in the monthly bills being paid on time. The smart card could be used, for example, by a hotel kiosk that recommends activities based on activity preference data stored on the card (e.g., visiting old churches and bicycling). Instead of a smart card, the same data could be stored on an radio frequency device, a personal digital assistant, or by any suitable means. The database 430 may be an external database that is performing a survey, such as a product survey. The database 430 may be a shopping list from a household network and the interaction with the user used to add and/or delete from the shopping list. Many other possibilities exist within the scope of the invention.

Figure 5:
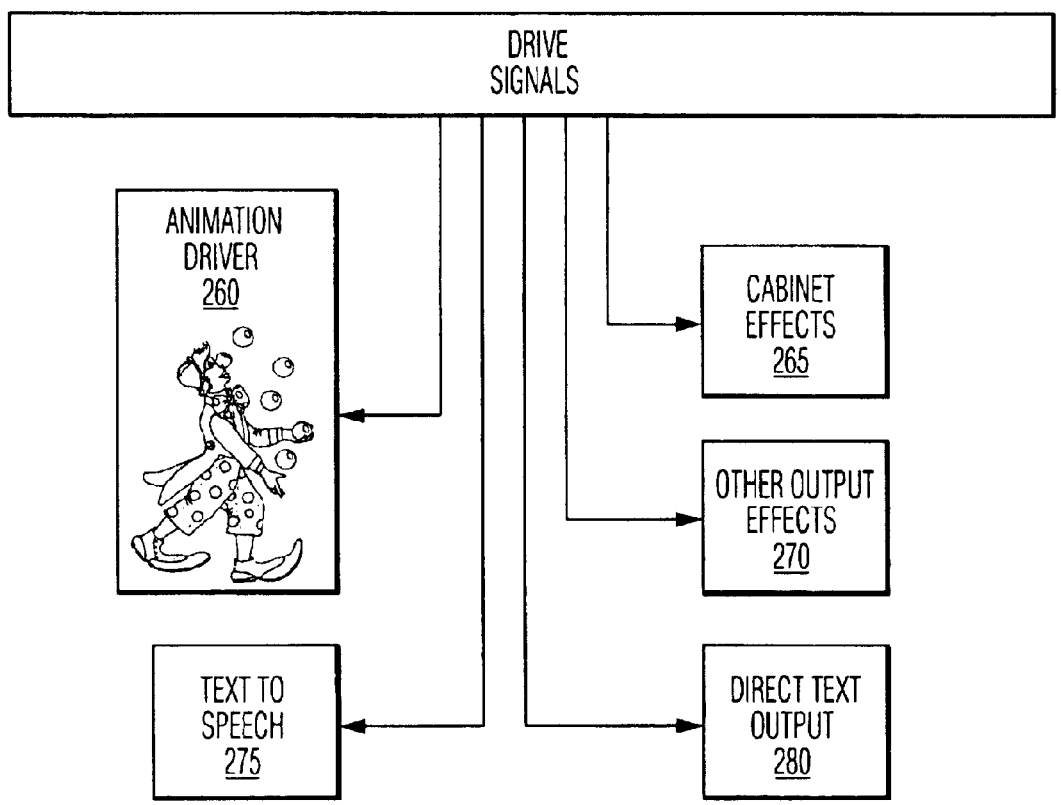

Referring now also to FIG. 5, for example, the response data store 440 may hold a set of templates each of which may call for driving one or more animations. Thus, when such a template is triggered, the response is an animation that is keyed to speech output (sound, etc.) or independent of any other output. The response generator 415 may select the output template and transmit it to an animation driver 260, shown in FIG. 5. The animation driver 260 in turn may output a particular corresponding animation on a display device (not shown). The display device may be a monitor 175 as shown in FIG. 1. The response generator 415 also selects templates that contain text. The response generator 415 may add text to the template text and transmit this to a text to speech converter 275 to generate speech output. Template selection and variable speech or variable text is handled in a traditional manner of a speech simulator such as Splotch. The response generator 415 may output text data directly to a direct text output 280 such as a display of a computer or a monitor. The response generator 415 may also access templates for providing other output effects 270. Another example of an output effect is cabinet effects driver 265 including variable illumination of a cabinet 190 of the monitor (Se FIG. 1), whose appearance changes in response to output commands. The animation provided by the animation driver 260 may be synchronized with the speech channel 80 by the text to speech converter 275 so that a character appearing on the animation may be given the appearance of speaking. The same synchronization may occur with other effects for example, the cabinet 190 of a television may be driven by the cabinet effects driver 265 and give the appearance to a user of the television having a personality. Or, the television may be given the appearance of being a person.

Input that is obtained either by the speech to text converter 215 or direct text input 250 are parsed by the input parser 410 and the parsed reply applied to the response generator 415 The response generator 415 selects the most appropriate templates in the response data store 440 based on the parsed reply, the mood/personality state, the environment/user state, and events signals. The response generator 415 may calculate a goodness of fit estimate for each candidate template based on all of the relevant signals. The result, for example, is that the response generator 415 is responsive not only to the utterances of the user in terms of the data contained in the text, but also to the many other factors discussed herein. Specifically, the classified emotional state and personality of the user may result in shifts in the content of conversation, the style (mood) of the conversation simulator's response.

Tracing the data flow beginning with the video input 255, the video input 255 signal is applied to the video image classifier 240. The video image classifier 240 is programmed to recognize a variety of different image and video-sequence classes in the video input 255 signal. For example, it may be programmed to distinguish between a person sitting up and lying down; between a person sitting still and one moving agitatedly or leaving the vicinity of the conversation simulator system; etc. A probability for each of these classes may be generated and output as a signal. Alternatively, a single, most-probable class may be generated and output as a signal. This signal is applied to the event/class processor 207, which combines this data with other class data to generate an environment/user state signal. If the event/class processor 207 receives an indication from the video image classifier 240 that something sudden and important has occurred, for example, the user has gotten up and left the room, the event/class processor 207 will generate an event signal to that effect which may interrupt output contemporaneously being generated by the response generator 415. If the mood/personality classifer 290 receives a signal from the video image classifier 240, indicating the user is moving in a fashion consistent with being agitated, that mood/personality classifer 290 may combine this information with other classifier signals to generate a mood/personality state vector indicating an emotional state of heightened anxiety. For example, the audio classifier 210 may be contemporaneously indicating that the speaker's voice is more highly pitched than usual and the input parser 410 may indicate that the word count of the most recent responses is unusually low. The choices of candidate response templates chosen by the response generator 415 will be affected by the mood/personality state, for example by choosing to change the topic of conversation to one or more that the response generator 415 is programmed to select in such circumstances.

Note that to allow the system to determine whether a current class or state represents a change from a previous time, the event/class processor 207 and the mood/personality classifer 290 may be provided with a data storage capability and means for determining the current user so that corresponding histories can be stored for different users. The system may also be provided with a user identifier 460. The latter may employ any suitable means for identifying the user such as face-recognition by means of the video image classifier 240, radio frequency identification token, smart card, voice signature, or a simple user interface that permits the user to identify him/herself with a biometric indicator such as a thumbprint or simply a PIN code. In this way, both the mood/personality classifer 290 and event/class processor 207 may each correlate historical data with particular users and employ it in identifying and signaling trends to the response generator 415

Another example of the response generator 415 responding to information from the various inputs is as follows. The conversation simulator application is generating speech when the video image classifier 240 identifies the image being received by video input 255 as being one of a person sleeping. The response generator 415 may halt the conversation and generate white noise or music. Another example is, if an additional person enters the room, the response generator 415 may cause a pause to be injected in a continuing conversation to allow the user to converse with the person that just entered the room. Then the conversation generator 240 may inject a statement such as asking to be introduced to the person that just entered the room or asking if the user would like to terminate the conversation. In yet another example, audio input 245 converted by the audio classifier 210 identifies a person is laughing. The audio classifier 210 may generate a signal to which the response generator 415 selects an alternative response template according to a rule in its programming indicating that laughs should be followed by responses that include jokes.

The input parser 410 may parse specific portions of sentences that correspond to interests or questions indicated by the user. For example, the user may ask, "Is it difficult to fix a home air conditioner?" or express an interest in Japanese cuisine. The input parser 410 may be programmed to extract the particular symbols or text data relevant to questions and stated interests and generate data requests. The response data generator 445 may then generate an instance of an agent 205 to obtain further information from resource data 450 such as a local network or the Internet (represented as "local network/Internet 200"). The data retrieved by the agent 205 may then be parsed by the response data generator 445 and a new template generated from it. To do this, the response generator 415 may be programmed to connect the response data with rules for its use. Several examples are discussed to demonstrate what is possible. First, the user asks the above question regarding air conditioners. The response data generator 445 receives the data request which indicates the subject matter and the particular need; in this case, the need being an immediate request for information. The agent 205 obtains an answer or two and the response data generator 445 frames a response and an indication that the answer should be given a high priority in the conversation simulator's conversation. In this case, the response preferably identifies the question asked. For example, the response may be "From what I am able to gather, the answer to your question regarding whether it is easy to fix a home air conditioner, <x>."The symbol, "<x>," represents the responsive data gathered from the resource data 450. Second, the user expresses an interest in Japanese cuisine which results in a data request for information that topic. The response data generator 445 retrieves related information and forms a few templates, such as, "Did you know that there is a highly-rated Japanese restaurant located on $14^{th}$ St?" along with an indication that this is a conversation starting or subject changing type of response and that it relates directly to an expressed user interest. The retrieved data may be introduced in later "conversation" by the interaction simulator or may delivered immediately.

The input parser 410 may operate using recognition templates, computational linguistic techniques, or other models for extracting specific kinds of information from sentences. For another example, if a user uses a sentence such as "I very much enjoyed the Pokeman television program that I saw yesterday." then the input parser 410 may extract the direct object "Pokeman," and transmit it as a data request because it corresponds to a certain recognition template or by identifying the direct object using natural language techniques. A recognition template may employ a rule such the proximity of "I" and "like." The natural language device is more flexible, but is capable of producing a similar result. Templates can be used to distinguish questions from declarations, likes from dislikes, etc. by simply using template sentence structures. The simpler template scheme may not use all the data in a user's utterance, but it can provide an easy-to-program technique that can provide a fairly convincing conversation simulator with relatively few rules.

The agent 205 may go out to the local network/Internet 200 and collect data such as links to further information in addition to text that appears, for example, on web sites match a search based on the data request. The response data generator 445 filters and parses the text or other data that are obtained from the agent 205. In working with reply text from the user and with raw text from the resource data 450, the input parser 410 and response data generator 445 may select specific words or phrases according to a recognition template or other natural language process. To facilitate comparison with other data, these processes may convert the selected text to canonical form. For example, key words that represent response templates may be limited to a predefined set of canonical terms. When the user generates an utterance, the user's own words are converted to their canonical form before comparing to the key word vectors characterizing the various response templates. In searching retrieved data, the conversion to canonical form may be followed by the generation of a search query that employs a disjunctive list of variants of the canonical term to obtain the highest possible hit rate.

Figure 6:
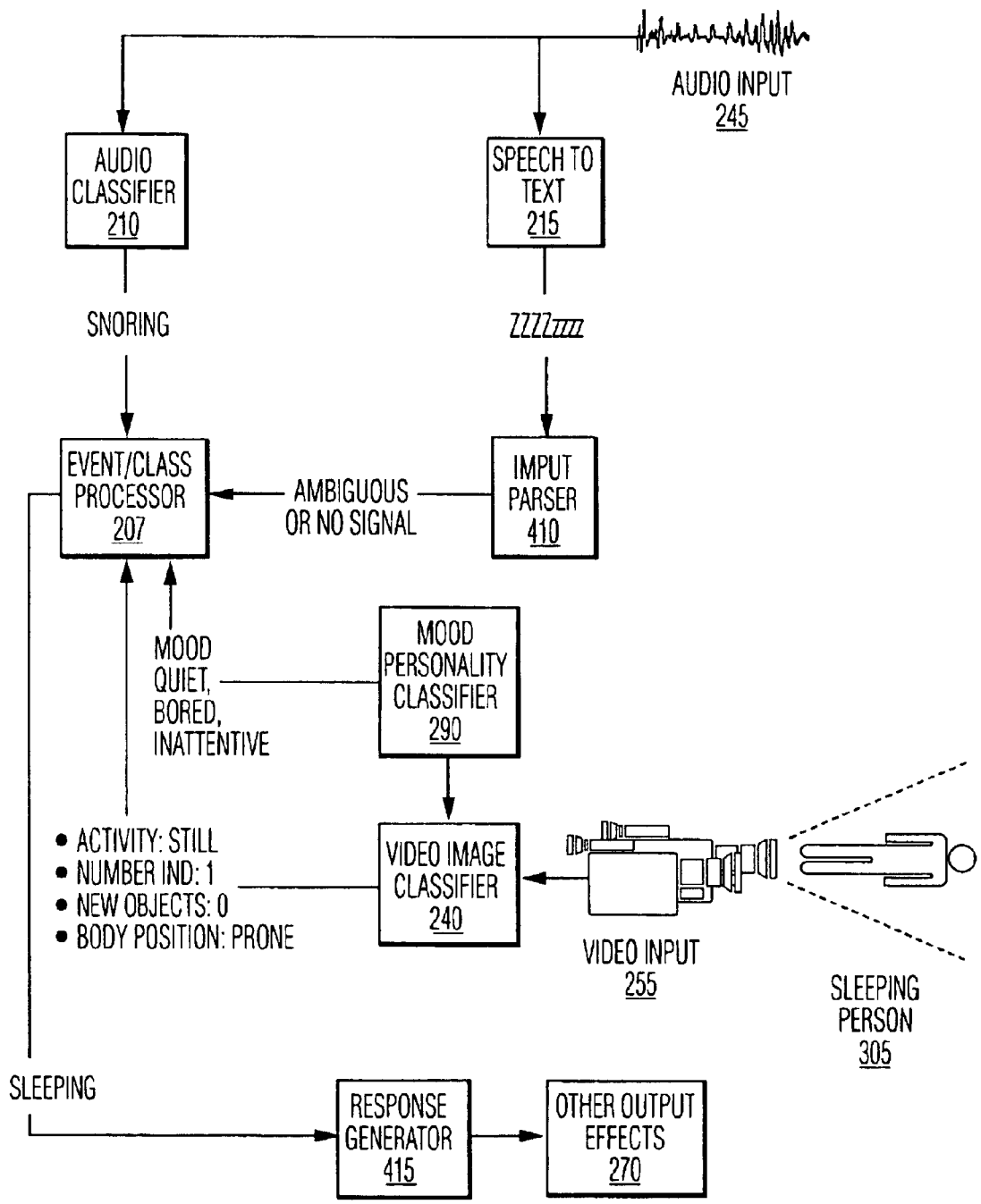
FIG. 6 is an illustration of an example situation of a user falling asleep and of the system of FIGS. 3–5 responding to that situation.

Referring to FIG. 6, the conversation simulator responds to the user's behavior and environment to insure that its own behavior is appropriate. For example, in the situation of FIG. 6 the user is sleeping. The video input 255 generates a signal that is applied to a video image classifier 240. The video image classifier 240 has a real time state vector with a list of elements. Each element adds information about the status of the conversation simulator's "visual" environment. For example, the user's activity could be classified among several different states. Here, the activity of the user is identified as "still," meaning that the user is not moving around the room and is relatively quiescent. Another element of the state vector may be the number of individuals in the room, in this case, one.

Another classification that the video image classifier 240 could identify easily with current technology is the number of new objects in the room. On a previous occasion the video image classifier 240 may have stored its environment with a simple schema. For example, it could take a photograph of the environment on a first day and when the system comes up again on a second day, the number of objects in the stored image could be compared with the number of objects identified within the current image. Then, the number of new objects can be output and this information used in generating replies.

Another classification is the body position, for example standing, prone, sitting and so on. In this case, the user has been identified as being in the prone position. The audio signal, which is also received by the conversation simulator system, is applied to two processes, the speech to text converter 215 and audio classifier 210. The input parser 410 attempts to identify the recognition templates that best match the text output by the speech to text converter 215. So, for example, the template matches for the snoring sound of a sleeping person may not correlate well with any particular recognition template. However, the additional information of having the audio classifier 210 indicate the snoring and the video image classifier 240 indicating the activity of the user causes the response generator 415 to identify a situation where speech output by the conversation simulator is inappropriate and instead the template selector/store 225 generates white sound (or music, no sound at all, or a lowering of the lights).

The event/class processor 207 acts as a filter and data consolidator. It combines the class data from multiple classifiers and may output higher level class information. In the example of FIG. 6, the event/class processor 207 has consolidated the inputs from the audio and video classifiers 210, 240 to generate a higher level class (a "metaclass") corresponding to the user's activity: sleeping. The audio classifier 210 inputs sound and attempts to identify it with a class it is trained to recognize. The event/class processor 207 receives class information from the audio classifier 210 and other classifiers and attempts to identify these with a metaclass it is trained to recognize. Of course, the architecture described herein is not the only way to implement the various features of the invention and the event/class processor 207 could simply be omitted and its functions taken over by the response generator 415 One advantage of separating the functions, however, is that the event/class processor 207 may employ a different type of classifier than the one used by the response generator 415 For example, the response generator 415 could use a rule-based template matcher such as employed by Splotch while the event/class processor 207 could use a trained neural network-type classifier. These allocations of functions may be more suitable since the number of outputs of the response generator 415 may be much higher than the number of classes the event/class processor 207 (or the other classifiers) is trained to recognize. This follows from the fact that network-type classifiers (such as neural network and Bayesian network classifiers) are notoriously difficult to train when they have a large number of possible output states.

The configuration of FIG. 6 substantially different from a prior art conversation simulator. Whereas the prior art conversation simulator would select the best template based solely on the speech pattern, the current system takes into account other information relevant to the user's circumstance and drives the conversation responsively to that information. The additional information from audio classifier 210 and the video image classifier 240 are used to generate a better response. The effect of this additional information and the use of it to provide the best possible output makes this system as a conversation simulator behave more like a real person.

Figure 7:
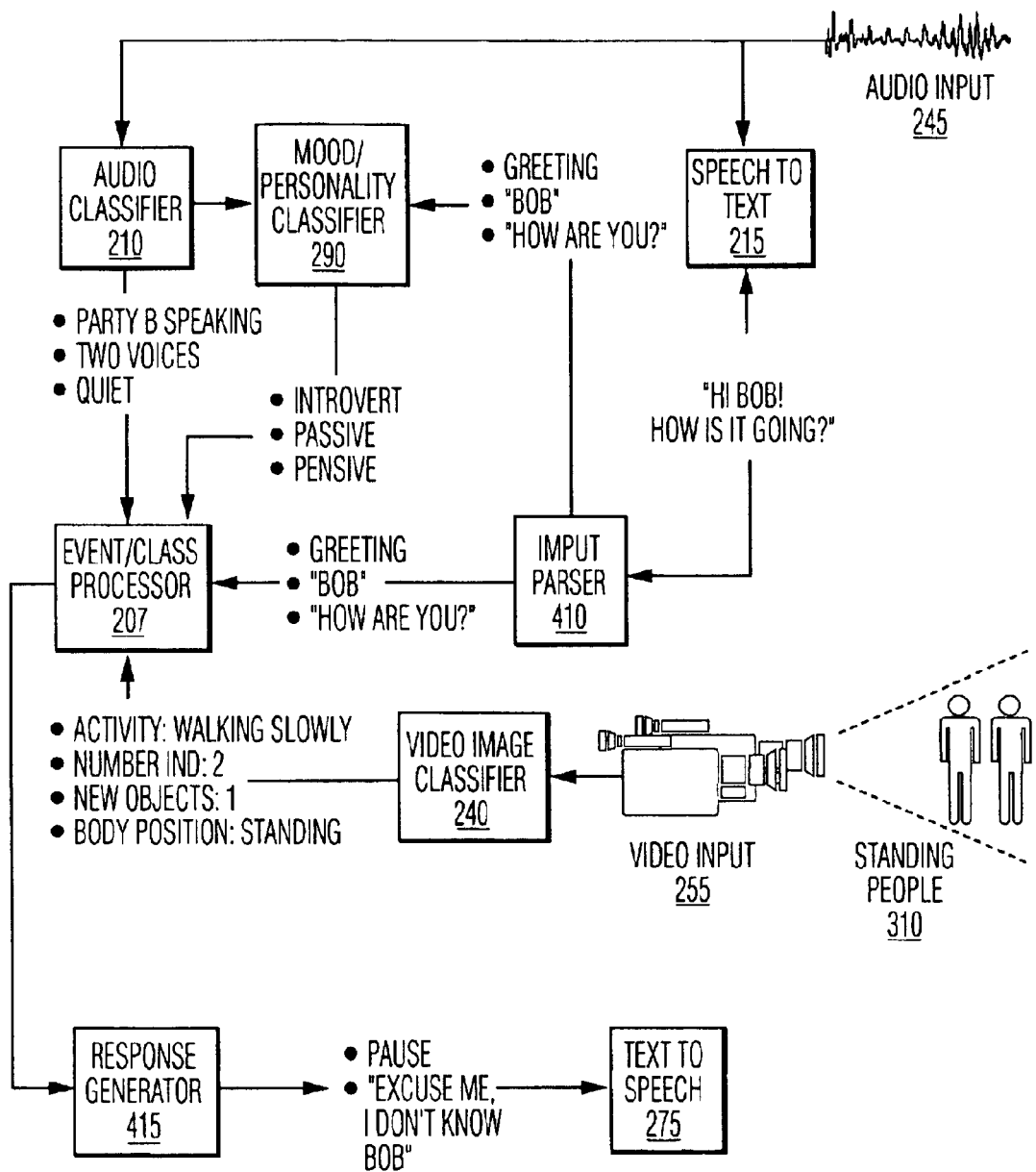
FIG. 7 is an illustration of an example situation of a user being interrupted by another person and of the system of FIGS. 3–5 responding to that situation.

Referring to FIG. 7, in a similar environment additional information obtained through video input 255 and audio input 245 are used, in addition to the text of the speech, to generate output by the conversation simulator. In this example, the audio classifier 210 outputs three indicators, one that indicates that someone other than the user is speaking, that there is a second voice, and then, subsequently, a period of silence. The speech to text converter 215 generates the text: "Hi Bob! How is it going?" The input parser 410 classifies the text as a greeting directed to "Bob" and a canonical form of the question asked. That is, "How is it going?" is indicated in the output of the input parser 410 as a standard form represented by, "How are you?" The same data are applied to the mood/personality classifier 290. The video image classifier 240 indicates that someone is walking slowly, that there are two individuals in the field of view, that there are no new objects, and that the body positions of the individuals indicate that they are standing. The mood/personality classifer 290 stores personality data regarding the user and has detected, from previous conversations, the user's mood. These are indicated in an output signal applied to the event/class processor 207.

The event/class processor 207 combines the audio classification indicating that there are two voices with the fact that the user's name was used in the text and the fact that there are two individuals in the room, one having just entered. The combination of the information may be recognized by the event/class processor 207 as a situation that should not be interrupted. It generates an event signal which is applied to the response generator 415 which stops outputting speech immediately, inserting a pause. Then the response generator 415 uses the other data from the classifiers to identify a template suggesting that it be introduced. The personality information from the mood/personality classifer 290 is employed in making this choice, the programmer having presumed that a more interventionist conversation simulator would suit a quiet introverted type in a social situation. The response generator 415 inserted a pause and then slightly later generated the statement "Excuse me, I don't know Bob." The word "Bob" came from the input parser 410 via the even/class processor 207.

Note that the video image classifier 240 may contain separate activity, body position, etc. classifications for each identified individual in the scene. Each of these may be output separately with a single vector for each person that has been identified by the video image classifier 240. Note also that the audio classifier 210 may have a directional capability so that it can also distinguish between the individuals that the sound is emanating from each. For example, in the scenario FIG. 7, the audio classifier 210 has identified a particular speaker, party A, who is speaking and indicated that in its output. To correlate the text that has been parsed by the input parser 410 with the individual that is speaking, all of the outputs may be time tagged. For example, audio classifier 210 can time tag the each sound signal and indicate the direction from which it came. The audio classifier 210 may also be given the ability to identify the voice print of the sound. Using this information, the event/class processor 207 can time tag the text and allow the response generator 415 to correlate the coordinates of the sound direction and the voice-print with the text. Then the text can be correlated with the individual that was speaking.

Figure 8:
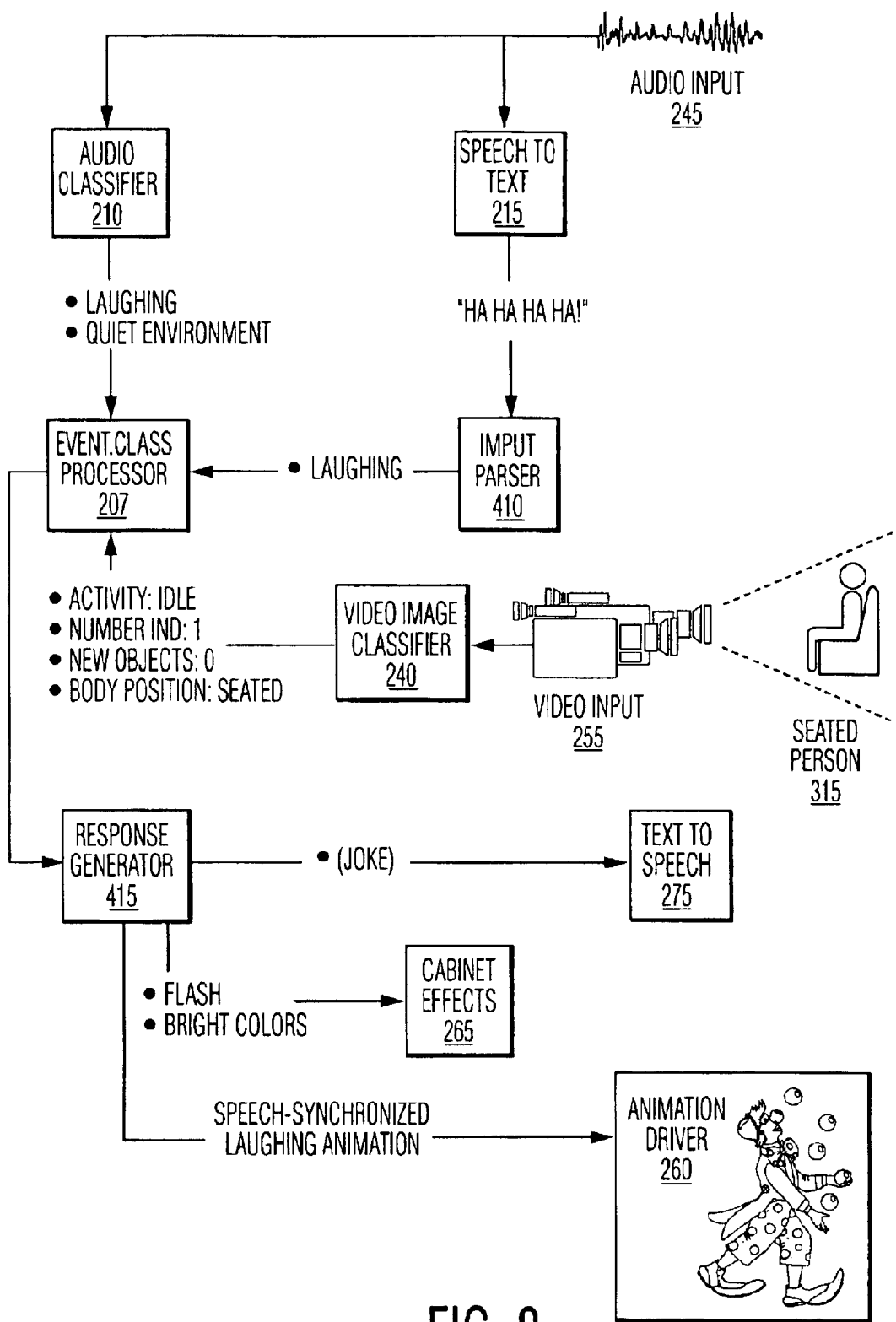
FIG. 8 is an illustration of an example situation of a user laughing and of the system of FIGS. 3–5 responding to that situation.

Referring to FIG. 8, a seated child in the field of view of the video input 255 causes a video image classifier 240 vector to be generated. The latter indicates that the user is seated, that the user is a child, that the number of individuals is one, and the activity level of the user is idle. The audio input 245 is applied again to the speech to text converter 215 and the audio classifier 210. The speech to text converter 215 applies text recognized in the child's laughter to the input parser 410. The input parser 410 generates a vector indicating that the user is laughing. The audio classifier 210 identifies the same class of sound. The video image classifier 240 classifies the user as idle and seated and indicates that there are no new objects and one individual present. The event/class processor 207 indicates that the user is laughing to the response generator 415 The response generator 415 is programmed with the simple rule that laughter should be followed with a funny declaration or joke. It randomly chooses a joke, which it applies to the text to speech converter 275. It also generates a synchronized light effect through the television cabinet effects driver 265 and an animation synchronized to the joke followed by a laughing animation through the animation driver 260.

Figure 9:
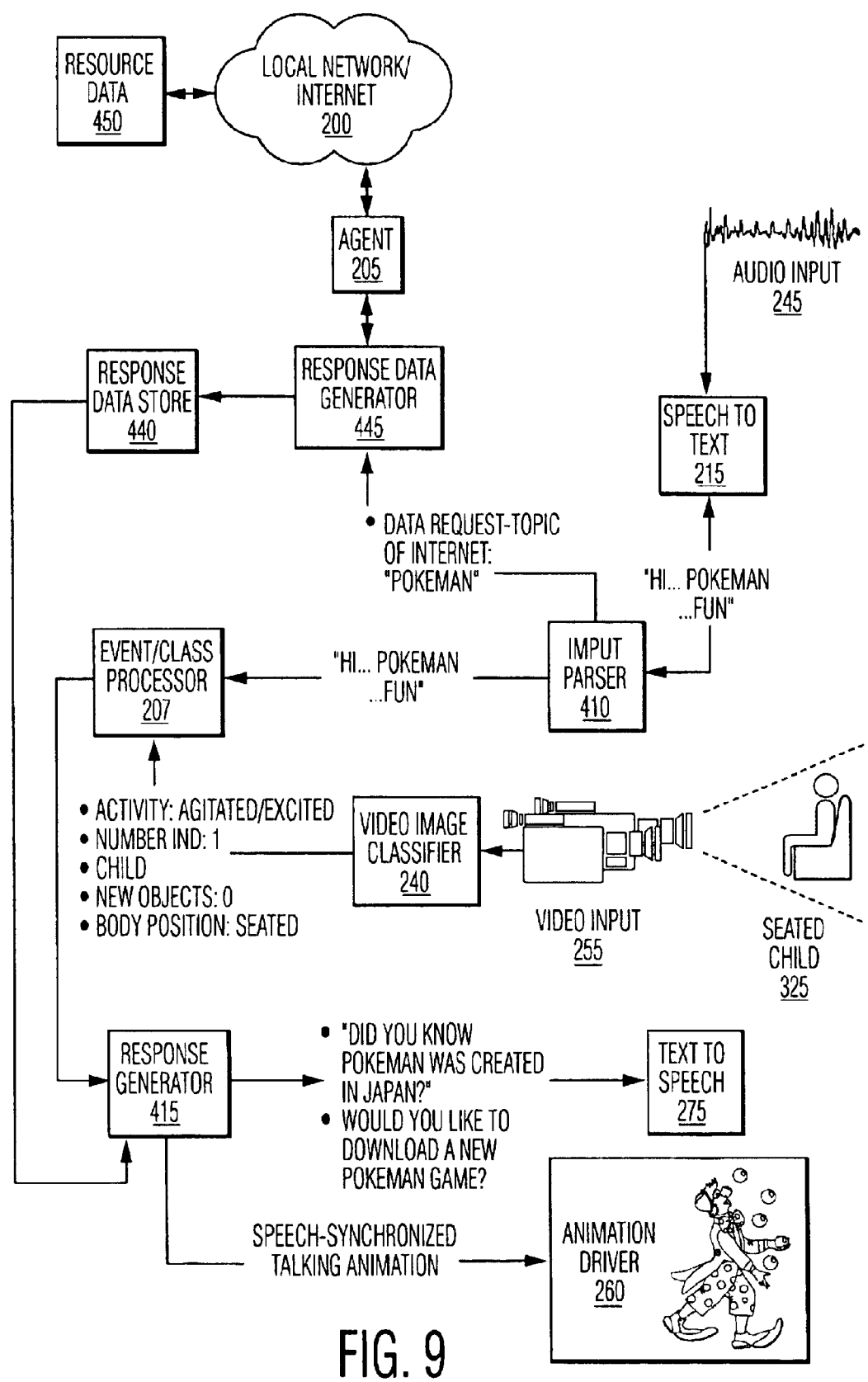
FIG. 9 is an illustration of an example situation of a user discussing a topic of interest and of the system of FIGS. 3–5 responding to that situation.

Referring to FIG. 9, data derived from a conversation with a user is parsed and used to generate new conversation data. The speech converted from the user's utterance contains the works "Pokeman" and "like" in close proximity and the input parser 410 identifies in this an express interest in the topic "Pokeman." It generates a request for further data on the topic of "Pokeman" and applies a signal indicating the request to the response data generator 445. The response data generator 445 creates an instance of the agent 205 which obtains data from the local network/Internet 200, which is in turn linked to resource data 450 such as World Wide Web sites. The further information is parsed and stored in the form of one or more response templates in the response data store 440 The video image classifier 240 classifies the user as a child and indicates that the user is excited or agitated. The event/class processor 207 indicates the content of the user's utterance and a metaclass state of eager and excited to describe the user's interest in the subject "Pokeman." As soon as the response generator 415 finds a "Pokeman" template in the response data store 440, it generates a response containing information obtained agent 205 and parsed and formed into responses by the response data generator 445. The response may be accompanied by a synchronous animation through the animation driver 260.

Figure 10:
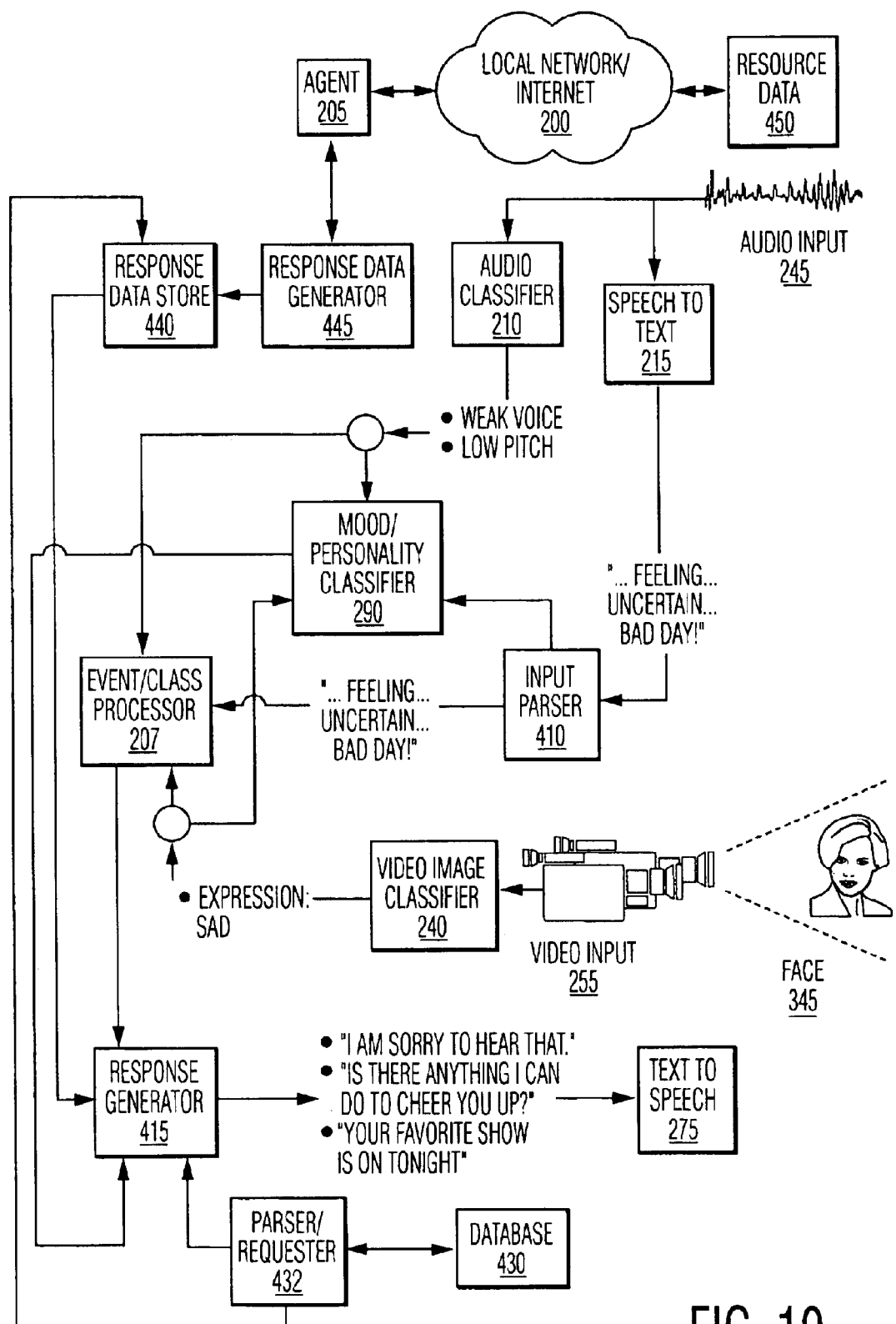
FIG. 10 is an illustration of an example situation of a user feeling melancholy and of the system of FIGS. 3–5 responding to that situation.

Referring to FIG. 10, the conversation simulator detects the sad mood of a user and generates a sympathetic response. It also uses preference data in a profile database to make a suggestion. The video input 255 includes the face of the user. The video image classifier 240 has classified the user's facial expression as sad. The user's replies contain other words that indicate a sad mood. The audio classifier 210 classifies the user's voice as weak and low in pitch. The mood/personality classifier 290 combines these classifications to generate a metaclassification of the user's mood, which is melancholy, and its output state vector expresses this. The response generator 415 receives the substance of the user's utterance, and in response to it along with the mood classification, finds a template corresponding to a sympathetic response and outputs it. The response data generator 445 has previously received profile data indicating such things as favorite television shows, hobby interests, etc. from the database 430, which may store profile data relating to the user. In response, the response data generator 445 has obtained programming information from electronic program guide from the resource data 450 and generated response templates, which it stored in the response data store 440 As a result the response generator followed its sympathetic statement with a cheering statement reminding the user that the user's favorite program was being broadcast tonight.

Figure 11:
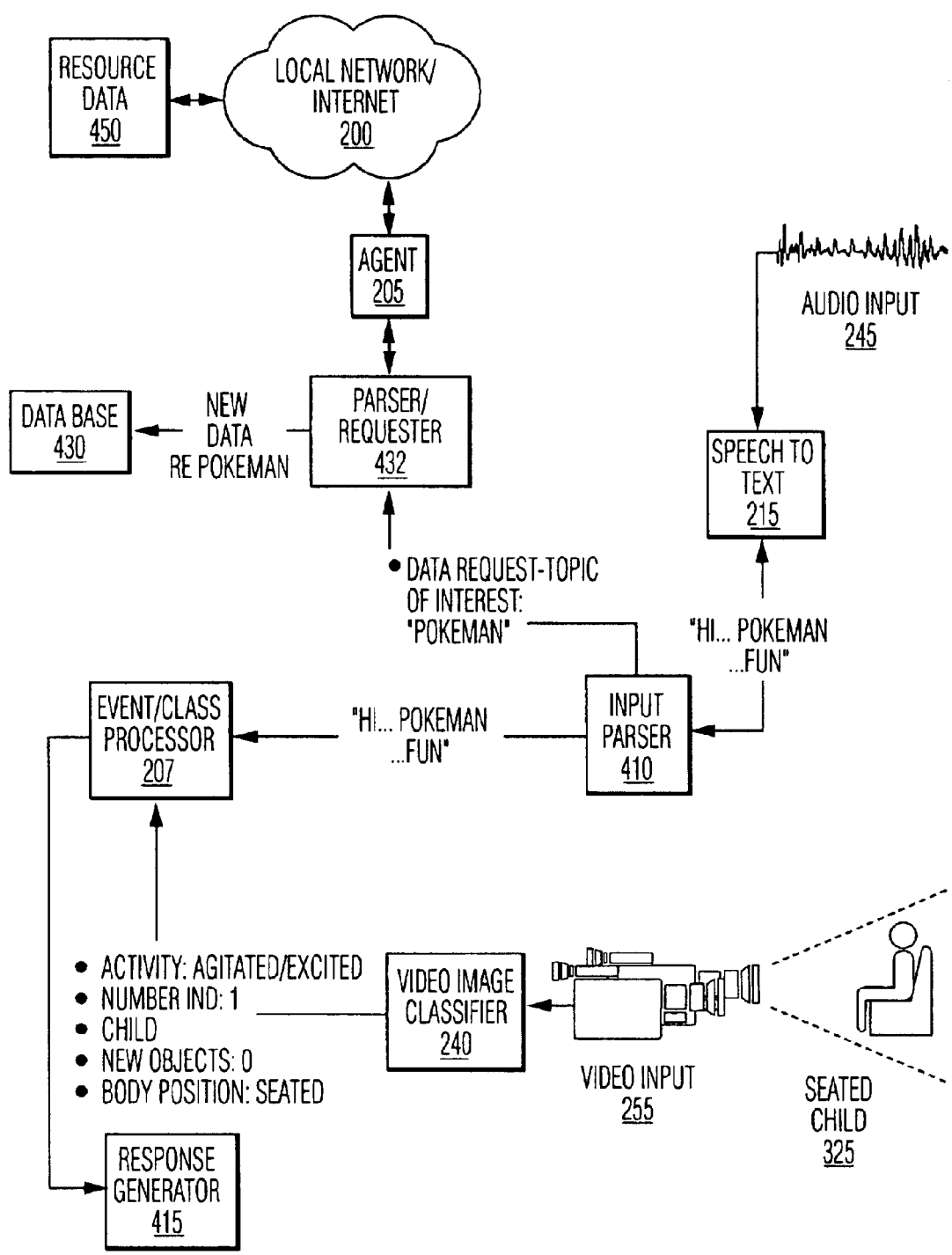
FIG. 11 is an illustration of an example situation of a user expressing an interest and of the system of FIGS. 3–5 responding to that situation by augmenting data in an external data store.

Referring to FIG. 11, the word "Pokeman" is extracted as discussed with reference to FIG. 9. However, instead of simply obtaining information from an outside data source for the purpose of making new response templates, as in FIG. 9, the data is used to augment the database 430.In the present example, the database 430 is a profile database that is used to filter and sort the contents of an EPG according to the user's preferences. The parser/requestor 432 receives the parsed reply from the input parser 410 and optionally generates an instance of the agent 205 to obtain further information. The agent 205 returns with new data regarding Pokeman and this is parsed and some of it possibly added to the database. For example, the names of Pokeman characters may be derived by the agent 205 and this data may added to the database 430 along with the information that the user has a preference for Pokeman.

Note that profile data (in the example stored in database 430 ) may be stored locally or on a remote server. The profile data may be used not only as a source for making new templates, but also as a source of information for forming personality classifications or otherwise personalizing responses.

Response data store 440 may be a database full of templates. These are not necessarily permanent templates. Many of them may be added to by the process of obtaining "live" data from the Internet and building new templates. The information that is extracted from the Internet or local network or data source by the response data generator 445 and incorporated in new templates can include text, links, or other kinds of data information such as graphics that can be displayed on the monitor 175.

An implementation of the conversation simulator may allow other devices to be driven by it as a speech actuated interface for the system. For example, the conversation simulator could say "Would you like to download a new Pokeman game?" and the speech to text converter could convey the statement "Yes" into a command and that command used to invoke a link that was obtained by the response data generator 445, accessing that link.

As the above example shows, the template set used for conversation simulation does not have to be a static set of information that only retrieves information from the user through a conversation. Rather, it can actually build templates using information from external sources. The external sources can be accessed on the initiative of the system or they can be accessed by trigger terms or trigger templates identified by the input parser 410 as in the above example. For example, when the word "Pokeman" was used in the sentence with "I like" that triggered the event of going out and instantiating the agent 205 to find further information and links, etc. to Pokeman related data facts.

The video image classifier 240 process may contain the ability to control the cameras (represented by video input 255 ) that receive video information. The video image classifier 240 may contain a process that regularly attempts to distinguish objects in the room that may or may not be individuals and zoom on various features of those individuals. For example, every time a video image classifier identifies a new individual that image classifier may attempt to identify where the face is in the visual field and regularly zoom in on the face of each individual that has been identified in the field of view in order to obtain facial expression information which can be used for identifying the individual or for identifying the mood of the individual.

While the present invention has been explained in the context of the preferred embodiments described above, it is to be understood that various changes may be made to those embodiments, and various equivalents may be substituted, without departing from the spirit or scope of the invention, as will be apparent to persons skilled in the relevant art.

What is claimed is:

1. A conversation simulator for simulating conversational interaction with a user, comprising:
   a controller programmed to receive first, second, and third user inputs, each chronologically separated by at least one reply from said controller;
   said first, second, and third user inputs each including a natural language declaration as distinguished from a query or a command;
   an output device connected to said controller to output said corresponding replies;
   a first input device connected to apply said first, second, and third user inputs to said controller;
   at least one second input device to receive environmental data indicating an environment of said user;
   said controller being programmed to classify said environment of said user responsively to said environmental data to produce class data, wherein said class data includes an indicator of a physical location of said user; and
   said controller being programmed to generate said at least one reply responsively to a corresponding one of said first, second and third user inputs and said class data.

2. A device as in claim 1, wherein said environmental data includes at least one of image and audio data.

3. A device as in claim 1, wherein said class data includes an indicator of a body position of said user.

4. A device as in claim 1, wherein said class data includes data indicating a presence of a person other than said user.

5. A device as in claim 1, wherein said class data includes data indicating an activity of said user.

6. A device as in claim 1, wherein said second input device includes at least one of a video camera and an audio detector.

7. A method of generating a dialogue response in a conversation simulator, comprising the steps of:
   receiving a natural language declaration from a user;
   determining a condition of an environment of said user including an indication of a physical location of said user;
   generating a response to said declaration responsively to a result of said step of determining and to a content of said declaration.

8. A method as in claim 7, wherein said step of receiving includes inputting speech through an audio transducer.

9. A method as in claim 7, said step of determining includes classifying image data from a camera.

10. A method as in claim 7, wherein said step of determining includes classifying image data from a camera, classifying audio data from an audio transducer.

11. A method as in claim 7, wherein said step of determining includes:
    classifying image data from a camera;
    classifying audio data from an audio transducer;
    combining results of said first and second steps of classifying to determine said condition.

12. A method as in claim 11, wherein said step of receiving includes inputting speech through an audio transducer.

13. A method as in claims 11, wherein said step of determining includes classifying at least one of image and audio data.

14. A method as in claim 11, wherein said step of determining includes classifying input data and determining a physical location of said user responsively to said input data.

15. A method as in claim 11, wherein said step of determining includes classifying input data and determining an activity of said user responsively to said input data.

16. A method of generating a dialogue response in a conversation simulator, comprising the steps of:
    receiving input from a user;
    determining a condition of an environment of said user including data indicating a presence of a person other than said user;
    generating a conditional response responsively to a result of said step of determining and to a content of said input, a condition of said conditional response being said result of said step of determining.

17. A device as in claim 16, wherein said step of determining includes classifying at least one of image and audio data.

18. A device as in claim 16, wherein said step of determining includes classifying input data and determining a physical location of said user responsively to said input data.

19. A device as in claim 16, wherein said step of determining includes classifying input data and determining an activity of said user responsively to said input data.

* * * * *